United States Patent
Rosendahl et al.

(10) Patent No.: US 11,815,943 B1
(45) Date of Patent: Nov. 14, 2023

(54) SYSTEMS AND METHODS FOR PROCESSING USING DIRECTED ACYCLIC GRAPHS

(71) Applicant: State Farm Mutual Automobile Insurance Company, Bloomington, IL (US)

(72) Inventors: Colin D. Rosendahl, Richardson, TX (US); Temitope Ibukunoluwa Oladipo, Plano, TX (US); Adam Benjamin Nunez, Wylie, TX (US); Matthew Joshua Tijerina, Richardson, TX (US); Adam Smith, McKinney, TX (US); Hugens Ulysse, Dallas, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 17/074,283

(22) Filed: Oct. 19, 2020

Related U.S. Application Data

(60) Provisional application No. 63/064,702, filed on Aug. 12, 2020, provisional application No. 63/035,279, filed on Jun. 5, 2020.

(51) Int. Cl.
G06F 16/901 (2019.01)
G06F 9/54 (2006.01)

(52) U.S. Cl.
CPC .......... *G06F 16/9024* (2019.01); *G06F 9/547* (2013.01)

(58) Field of Classification Search
CPC .............................. G06F 16/9024; G06F 9/547
(Continued)

(56) References Cited

U.S. PATENT DOCUMENTS 7,656,857 B2 2/2010 Thubert et al.
8,301,755 B2 10/2012 De Peuter et al.
(Continued)

FOREIGN PATENT DOCUMENTS

CN 111523784 A * 8/2020 ......... G06F 21/6218

OTHER PUBLICATIONS

Chaudhry et al., Pareto-based evolutionary computational approach for wireless sensor placement, Jul. 2010, Engineering ApplicationsofArtificialIntelligence24(2011)409-425, All pages (Year: 2010).*

(Continued)

*Primary Examiner* — Amy Ng
*Assistant Examiner* — Antonio J Caiado
(74) *Attorney, Agent, or Firm* — Armstrong Teasdale LLP

(57) ABSTRACT

A computer system for executing a processing graph including: (A) access a graph definition of the processing graph from a nodes database, the graph definition identifies nodes and edges, each edge connects a pair of nodes, each node represents a component of computation performed by at least one program referenced by that node; (B) constructing the processing graph in the memory; (C) traversing the processing graph to visit and process each node in the processing graph; (D) upon visiting a first node of the processing graph, accessing a first node definition of the first node from the nodes database, the first node definition identifies a first program; (E) executing the first program to generate a first output; and (F) passing the first output to a parent node of the first node, the parent node uses the first output during processing of the parent node.

20 Claims, 15 Drawing Sheets

(58) Field of Classification Search
USPC ......................................................... 707/798
See application file for complete search history.

(56) References Cited

U.S. PATENT DOCUMENTS

| | | | |
|---|---|---|---|
| 8,788,556 B2 | 7/2014 | Zhang et al. | |
| 9,753,751 B2 | 9/2017 | Atterbury et al. | |
| 9,922,376 B1 | 3/2018 | Wang et al. | |
| 10,109,014 B1* | 10/2018 | Bischoff | G06F 16/90335 |
| 10,163,156 B1* | 12/2018 | Shapley | G06Q 40/025 |
| 10,445,451 B2 | 10/2019 | Fleming et al. | |
| 10,672,078 B1* | 6/2020 | Tagny Diesse | G06Q 40/08 |
| 11,030,187 B1* | 6/2021 | Boodman | G06F 16/285 |
| 11,361,027 B2* | 6/2022 | Reehil | G06F 16/219 |
| 11,397,713 B2* | 7/2022 | Maharajh | G06F 16/219 |
| 11,507,741 B2* | 11/2022 | Maguire | G06F 16/9024 |
| 2006/0059461 A1* | 3/2006 | Baker | G06F 8/20 717/113 |
| 2007/0169019 A1* | 7/2007 | Leino | G06F 11/3608 717/136 |
| 2011/0105143 A1* | 5/2011 | Harple | G06F 16/29 455/456.1 |
| 2011/0173258 A1* | 7/2011 | Arimilli | G06F 15/16 709/204 |
| 2011/0321051 A1 | 12/2011 | Rastogi | |
| 2012/0291045 A1 | 11/2012 | Martin | |
| 2014/0108463 A1* | 4/2014 | Gagliardi | G06F 11/3495 707/E17.044 |
| 2016/0103706 A1 | 4/2016 | Novaes | |
| 2016/0350080 A1* | 12/2016 | Ravindran | G06F 8/20 |
| 2017/0063886 A1* | 3/2017 | Muddu | H04L 43/00 |
| 2018/0203673 A1 | 7/2018 | Ravishankar | |
| 2019/0005161 A1* | 1/2019 | Fleming | G06F 12/0895 |
| 2019/0121810 A1* | 4/2019 | Zhuang | G06F 16/254 |
| 2019/0188261 A1* | 6/2019 | Herzig | G06F 40/35 |
| 2019/0235742 A1* | 8/2019 | Tilikin | G06T 11/60 |
| 2021/0026894 A1* | 1/2021 | Yang | G06F 16/903 |
| 2021/0248115 A1* | 8/2021 | Jones | G06F 9/5038 |
| 2021/0248445 A1 | 8/2021 | Zhou | |
| 2021/0320794 A1* | 10/2021 | Auh | H04L 9/14 |
| 2021/0390420 A1* | 12/2021 | Barnett | G06N 5/022 |
| 2022/0012812 A1* | 1/2022 | Roll | G06Q 30/08 |
| 2022/0019896 A1* | 1/2022 | Vasudevan | G06F 9/5066 |
| 2022/0075515 A1* | 3/2022 | Floren | G06F 3/04847 |

OTHER PUBLICATIONS

Allombert et al., "Multi-ML: Programming Multi-BSP Algorithms in ML", International Journal of Parallel Programming, pp. 20, hal-01160164v3, (Year: 2016).

Kim et al., "WW-Flow: Web-Based Workflow Management with Runtime Encapsulation", IEEE Internet Computing, (Year: 2000).

Miller, "The Task Graph Pattern", Parallel Programming Partners (ParaPLoP 10) (Year: 2010).

Sun et al., "Developing a Workflow Design Framework Based on Dataflow Analysis", Proceedings of the 41st Hawaii International Conference on System Sciences, (Year: 2008).

\* cited by examiner

Model Management Workbench

Dag Management System

- Job Dashboard
- Dag Sets
- Global Nodes
- Staging

Staging Jobs

| Status | Dag Set ID | Triggered By | Triggered All | Not Found Nodes | Stiching | Image Creation |
|---|---|---|---|---|---|---|
| ⊘ Complete | dms_main_test_dwg_master_1592247808 9805424 | few | Mom, 15 Jun 2020 19:00.29 GMT | input | ⊘ Complete | ⊘ Complete |
| ⊘ Complete | dms_main_test_dwg_master_1592247808 9805424 | few | Mom, 15 Jun 2020 17:13.02 GMT | input | ⊘ Complete | ⊘ Complete |

FIG. 10

Model Management Workbench

Dag Management System

- Job Dashboard
- Dag Sets
- Global Nodes
- Staging

Tools ⌄

Dag Sets

| Name | Timestamp | Details |
|---|---|---|
| OH_V1 | | |
| count-variant-a-v0001 | 2020-04-23T14:45:39.5112 | View |
| info-a-flag-v0001 | 2020-04-23T14:45:39.5112 | View |
| info-b-flag-v0001 | 2020-04-23T14:45:39.5112 | View |

FIG. 11

| Model Management Workbench | | | Tools ∨ |
|---|---|---|---|
| Dag Management System | | | |
| ⟳ Job Dashboard | Global Nodes | | |
| ≡ Dag Sets | Name | Timestamp | Details |
| 🌐 Global Nodes | 🗋 driver_age | 2020-04-23T14:45:39.5112 | View |
| ⇧ Staging | 🗋 grouping | 2020-04-23T14:45:39.5112 | View |
| | 🗋 average_car_age | 2020-04-23T14:45:39.5112 | View |
| | 🗋 max_car_age | 2020-04-23T14:45:39.5112 | View |
| | 🗋 vehicle_count | 2020-04-23T14:45:39.5112 | View |

FIG. 12

SYSTEMS AND METHODS FOR PROCESSING USING DIRECTED ACYCLIC GRAPHS

CROSS-REFERENCE TO RELATED APPLICATIONS

This application claims priority to and the benefit of the filing date of U.S. Provisional Application No. 63/035,279 filed on Jun. 5, 2020, entitled "SYSTEMS AND METHODS FOR PROCESSING USING DIRECTED ACYCLIC GRAPHS," and U.S.

Provisional Application No. 63/064,702 filed on Aug. 12, 2020, entitled "SYSTEMS AND METHODS FOR PROCESSING USING DIRECTED ACYCLIC GRAPHS," the entire contents and disclosures of which are hereby incorporated by reference in their entirety.

FIELD OF THE INVENTION

The present disclosure relates to processing flow control and, more particularly, to a graph-based system and method for processing flow control using directed acyclic graphs.

BACKGROUND

Conventional computer-implemented data processing methods often involve an executable, script, or other program that is configured to perform simple or complex calculations to generate some desired output data. These programs may include aspects of flow control and logic primitives that allow the programmer to configure the program to perform more complex calculations (e.g., conditioned based upon input data, execution parameters, or other variables). However, as calculations become more complex, a single program may grow in both size and complexity, which can cause difficulties in management and hinder flexibility or future changes. Libraries of functions, objects, or other component processing have been developed to ease some of the burdens of complex programmatic calculations, but many complex and composite calculation processes exist that can still benefit from greater flexibility and ease of use than can be provided by conventional programming methodologies and tools. Conventional techniques may include additional drawbacks as well.

BRIEF SUMMARY

The present embodiments may relate to systems and methods for a graph-based system and method for processing flow control using directed acyclic graphs. The system may include a graph management system and/or one or more user computer devices. In one aspect, the present embodiments may generate a processing graph based upon dependencies defined in nodes of a nodes database. The graph management system may also execute the processing graphs by visiting each node within the graph and performing particular calculations or other processing or computations that may be aggregated to achieve a desired output.

The graph management system may be configured to: (i) create a processing graph to include at least a plurality of nodes and one or more edges, each edge of the one or more edges connects a pair of nodes, each node of the processing graph represents a component of computation performed by at least one program referenced by that node; (ii) identify a first node of the plurality of nodes within the processing graph; (iii) access a first node definition of the first node from a nodes database, the first node definition identifies a dependency node, the dependency node represents a component of computation that generates output data used by the first node; (iv) add a second node to the graph as a child of the first node, the second node representing the dependency node; (v) add a first edge to the graph connecting the first node to the second node; (vi) recursively traverse the processing graph to identify all dependency nodes that are not yet included in the processing graph and add all of the dependency nodes to the processing graph; (vii) access a graph definition of the processing graph from a nodes database, the graph definition identifies a plurality of nodes and one or more edges, each edge of the one or more edges connects a pair of nodes of the plurality of nodes, each node of the processing graph represents a component of computation performed by at least one program referenced by that node; (viii) construct the processing graph in the memory; (ix) traverse the processing graph to visit and process each node in the processing graph; (x) upon visiting a first node of the processing graph, access a first node definition of the first node from the nodes database, the first node definition identifies a first program; (xi) execute the first program to generate a first output; and/or (xii) pass the first output to a parent node of the first node, the parent node uses the first output during processing of the parent node.

In one aspect, a computer system for creating a processing graph is provided. The computer system may include at least one processor in communication with at least one memory device. The at least one processor may be programmed to: (i) create the processing graph to include at least a plurality of nodes and one or more edges, each edge of the one or more edges connects a pair of nodes, each node of the processing graph represents a component of computation performed by at least one program referenced by that node; (ii) identify a first node of the plurality of nodes within the processing graph; (iii) access a first node definition of the first node from a nodes database, the first node definition identifies a dependency node, the dependency node represents a component of computation that generates output data used by the first node; (iv) add a second node to the graph as a child of the first node, the second node representing the dependency node; and/or (v) add a first edge to the graph connecting the first node to the second node. The computer system may include additional, fewer, or alternative components and/or functions, including those described elsewhere herein.

In another aspect, a computer-implemented method for creating a processing graph is provided. The method may be implemented by a computer device including at least one processor in communication with at least one memory device. The method may include: (i) creating the processing graph to include at least a plurality of nodes and one or more edges, each edge of the one or more edges connects a pair of nodes, each node of the processing graph represents a component of computation performed by at least one program referenced by that node; (ii) identifying a first node of the plurality of nodes within the processing graph; (iii) accessing a first node definition of the first node from a nodes database, the first node definition identifies a dependency node, the dependency node represents a component of computation that generates output data used by the first node; (iv) adding a second node to the graph as a child of the first node, the second node representing the dependency node; and/or (v) adding a first edge to the graph connecting the first node to the second node. The computer-implemented method may include additional, fewer, or alternative components and/or functions, including those described elsewhere herein.

In yet another aspect, a non-transitory computer readable medium having computer-executable instructions embodied thereon for creating a processing graph is provided. When executed by at least one processor, the computer-executable instructions may cause the at least one processor to: (i) create a processing graph to include at least a plurality of nodes and one or more edges, each edge of the one or more edges connects a pair of nodes, each node of the processing graph represents a component of computation performed by at least one program referenced by that node; (ii) identify a first node of the plurality of nodes within the processing graph; (iii) access a first node definition of the first node from a nodes database, the first node definition identifies a dependency node, the dependency node represents a component of computation that generates output data used by the first node; (iv) add a second node to the graph as a child of the first node, the second node representing the dependency node; and (v) add a first edge to the graph connecting the first node to the second node. The computer readable medium may include additional, fewer, or alternative components and/or functions, including those described elsewhere herein.

In still another aspect, a computer system for executing a processing graph is provided. The computer system may include at least one processor in communication with at least one memory device. The at least one processor may be programmed to: (i) access a graph definition of the processing graph from a nodes database, the graph definition identifies a plurality of nodes and one or more edges, each edge of the one or more edges connects a pair of nodes of the plurality of nodes, each node of the processing graph represents a component of computation performed by at least one program referenced by that node; (ii) construct the processing graph in the memory; (iii) traverse the processing graph to visit and process each node in the processing graph; (iv) upon visiting a first node of the processing graph, access a first node definition of the first node from the nodes database, the first node definition identifies a first program; (v) execute the first program to generate a first output; and/or (vi) pass the first output to a parent node of the first node, the parent node uses the first output during processing of the parent node. The computer system may include additional, fewer, or alternative components and/or functions, including those described elsewhere herein.

In yet another aspect, a computer-implemented method for executing a processing graph is provided. The method may be implemented by a computer device including at least one processor in communication with at least one memory device. The method may include: (i) accessing a graph definition of the processing graph from a nodes database, the graph definition identifies a plurality of nodes and one or more edges, each edge of the one or more edges connects a pair of nodes of the plurality of nodes, each node of the processing graph represents a component of computation performed by at least one program referenced by that node; (ii) constructing the processing graph in the memory; (iii) traversing the processing graph to visit and process each node in the processing graph; (iv) upon visiting a first node of the processing graph, accessing a first node definition of the first node from the nodes database, the first node definition identifies a first program; (v) executing the first program to generate a first output; and/or (vi) passing the first output to a parent node of the first node, the parent node uses the first output during processing of the parent node.

The computer-implemented method may include additional, fewer, or alternative components and/or functions, including those described elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIG. 10 illustrates an exemplary jobs dashboard view of the GUI shown in FIG. 9 that allows users to view execution status and other information associated with executing or previously-executed graphs.

FIG. 11 illustrates an exemplary dag sets view of the GUI shown in FIG. 9 that provides a list of graphs or sub-graphs, along with a name of each graph, a timestamp (e.g., creation time, last edit time), and a details field (e.g., a view button that allows deeper inspection of the graph).

FIG. 12 illustrates an exemplary global nodes view of the GUI 902 shown in FIG. 9 that provides a list of nodes that have been configured and saved (e.g., in the nodes database 110), along with a name of the node, a timestamp (e.g., creation time, last edit time), and a details field (e.g., a view button that allows deeper inspection of the node).

Figure 1:
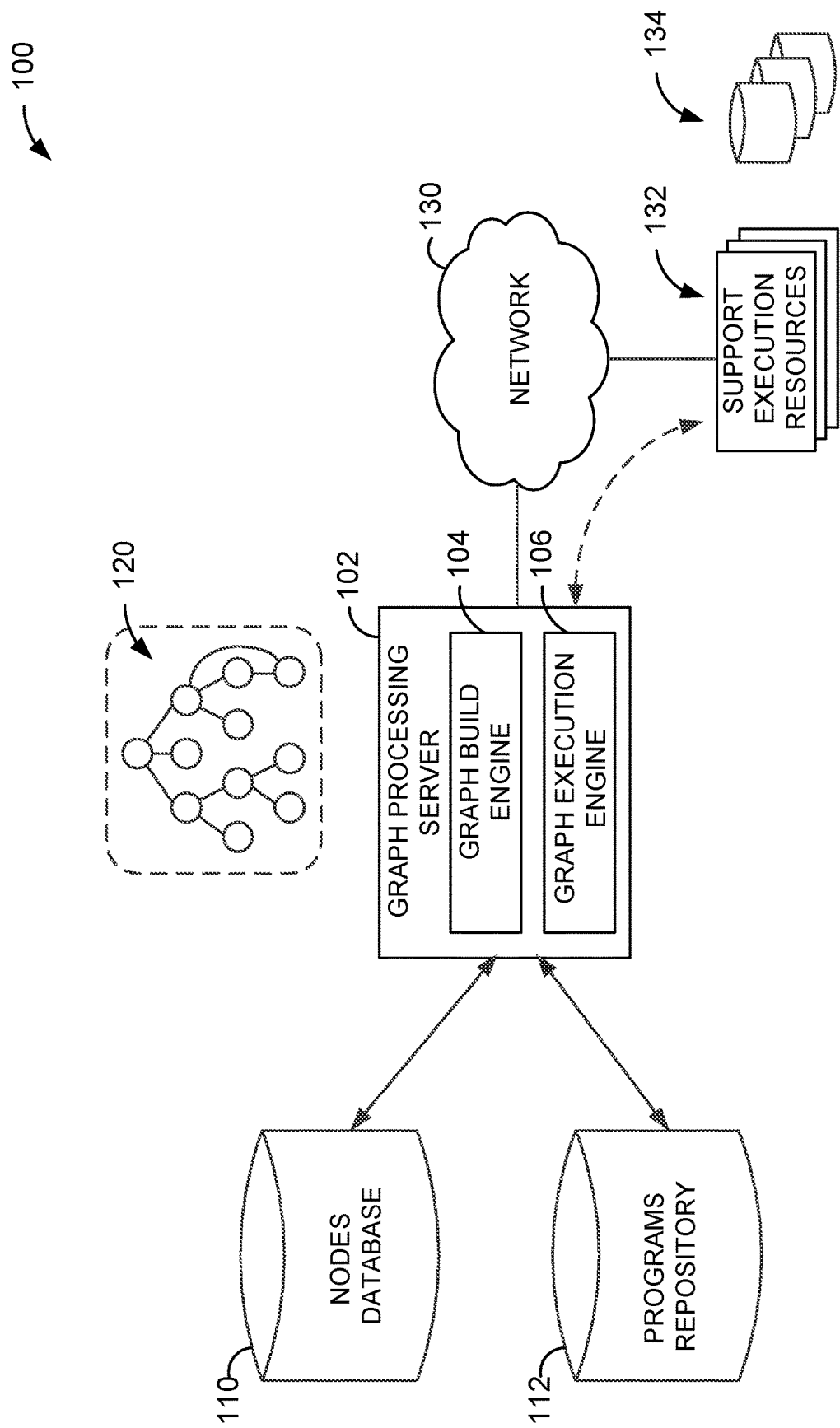
FIG. 1 illustrates an exemplary graph management system ("GMS") that may be used for creating and executing processing graphs, in accordance with the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating processing graphs that may be used to execute complex, composite calculations (e.g., calculations using many functional components, sub-components, inputs, models, and the like, to generate desired data). In one exemplary embodiment, the process may be performed by a graph management system that includes a graph management server ("GMS"). The GMS may include a graph build engine that is configured to build processing graphs using nodes and sub-graphs from a nodes database, where the processing graphs include nodes that define work components and edges that define data flow relationships between those work components.

Further, the graph management server may include a graph execution engine. The graph execution engine may be configured to perform data processing using the processing graphs built by the graph build engine or stored in the nodes database, where execution of the processing graphs includes traversing the processing graph to each node based upon the construction and dependencies of the graph and executing work components for each node.

In the exemplary embodiment, the graph build engine may construct the processing graph based upon given inputs (e.g., initial input parameters, models, or other input data provided by the user or other data source) and desired outputs (e.g., what output data the graph is configured to produce). The processing graphs may be constructed of nodes and edges connecting those nodes. Nodes within the graph may represent functional components of work or process steps (e.g., functions, scripts, executables, libraries, third party service calls, or the like, collectively referred to herein as "referenced programs") that may be used to produce particular outputs that, in turn, may be provided to other nodes in the graph. These nodes and graphs may be stored in a nodes database. Each node may include a node definition that defines parameters such as a node name and unique ID ("node UID"), outputs, inputs, node dependencies, and referenced programs (e.g., source programs, executable programs, links to programs used to perform the processing aspects of the node).

Some nodes may include dependencies on other nodes that may be defined in the nodes database. These dependent nodes may be used, for example, to generate interim outputs that may be used by the node in an overall calculation (e.g., to generate the final outputs of that node) and, as such, the GMS may generate links to these dependent nodes from the parent node when constructing the processing graph using edges connecting the parent node to the dependent node(s).

In the exemplary embodiment, the GMS may generate the processing graphs as directed acyclic graphs ("DAGs"). In a DAG, each edge is a directed edge (or arc), pointing from a parent node to a child node within the processing graph, where the relationship defines a dependency of the parent node on the child node (e.g., the directed edge pointing deeper into the graph to initiate additional processing), and may include a data flow of the output from the child node up to the parent node (e.g., in the opposite direction of the directed edge). Further, the acyclic nature of a DAG causes the graph to be non-circular.

In other words, graph traversal may only visit and process each node in the graph once. Further, during graph traversal, inputs may propagate down through the graph from a parent node to a child node and outputs may propagate up through the graph from a child node to a parent node.

During graph build, in the exemplary embodiment, the GMS may identify a root node within the nodes database or may construct a new root node based upon provided input parameters and desired outputs. In some embodiments, the GMS may provide an administrative graphical user interface ("admin GUI") configured to allow a user to define the root node, specify initial input parameters, configure an initial root graph, or otherwise provide initial graph configuration data that may be used by the GMS to construct a complete processing graph. Once the GMS has the initial graph configuration data and at least a root node, the graph build engine constructs a complete processing graph. The build engine may identify the initial nodes and their node definitions within the nodes database and recursively traverse the initial graph to add additional nodes. Any nodes that do not identify dependency nodes may be marked as leaf nodes, indicating that the leaf node is dependent on no other nodes, and thus may not invoke any deeper nodes during execution.

For nodes that do reference one or more dependency nodes ("parent nodes"), each dependency node is added to the graph as a child node of that parent node, with an edge connecting the parent node to that child node. The build engine may then access node definitions for the new child node(s) from the nodes database and continue traversal of the graph, inspecting each of the child nodes for deeper children nodes.

Some nodes may reference a sub-graph stored within the nodes database. Sub-graphs are pre-configured processing graphs that identify two or more nodes and pre-defined edges between those nodes. Such sub-graphs may be referenced by various nodes and, as such, may cause the build engine to add an entire sub-graph to the current processing graph during graph build. The build engine continues recursive traversal and node additions until a complete processing graph has been constructed (e.g., until all dependency nodes have been identified and added to the graph). The GMS may save the completed processing graph in the nodes database or otherwise within memory or storage on the graph management server.

In the exemplary embodiment, the graph execution engine is used by the GMS to execute the complete processing graph. During execution, the graph execution engine may perform a recursive traversal of the processing graph starting at the root node of the graph. Each visit to a node of the graph causes the graph execution engine to execute the referenced program(s) of that current node and, for any children node of the current node, may cause the graph execution engine to traverse to a child node for deeper node execution. Execution of the initial root node of the graph may include receiving or otherwise acquiring input parameters for the root node.

Traversing from a parent node to a child node may include passing input data to the child node, and returning from a child node to a parent node may include passing output data from the child node to the parent node. As such, execution of each particular node may utilize input data received from a parent of that current node or output data received from any or all children nodes of that current node. Where each node is configured to perform some particular calculations or other process operations, the execution of that node and any dependent children allows the graph execution engine to perform the operations for that node and return any output data up the graph to the parent of the current node. Such a recursive, controlled traversal of the processing graph allows the graph execution engine to process each node and its sub-graph to completion, passing up the outputs of each node and sub-graph until all of the children of the root node are complete and the root node can generate its final output data.

In one exemplary embodiment, the GMS may be used (e.g., by an insurance underwriter for example) to perform various calculations regarding policy pricing, quoting, or eligibility for auto insurance, motorcycle insurance, renters insurance, home insurance, personal articles insurance, or the like. Such insurance policy calculations can be quite complex, utilizing a myriad of input factors, calculations, models, jurisdictional parameters, public data points, or the like.

Further, underwriters often support dozens or hundreds of jurisdictions, each of which may have specific variations in calculations, limitations, or other nuances that affect such calculations. This GMS may allow underwriters to pre-configure various nodes or sub-graphs with specific calculations that can be integrated together to support complex, composite calculations. The GMS may facilitate greater modularity and ease of configuration and reusability of modules through creation of nodes and sub-graphs that can be configured or customized to perform specific calculations or sub-calculations, allowing such calculations to be performed based upon dependency configuration and rolled up to generate a composite result.

While various examples provided herein describe application of the GMS to various aspects of insurance underwriting, the systems and methods described herein may also be used for performing other composite calculations or other functions. For instance, the present embodiments may be employed to facilitate financial services and products, insurance quoting, insurance claim handling, and providing usage-based insurance (UBI) or on-demand insurance, as well as providing UBI or on-demand insurance quotes. The present embodiments may also be employed to facilitate providing services and products related to autonomous vehicles, telematics, vehicle telematics, home telematics, intelligent or smart homes, drones, big data, sensor data collection and analysis (such as mobile device, vehicle, drone, wearable, smart glasses, smart watch, and home sensor data collection and analysis), and other areas.

Exemplary Graph Processing System

FIG. 1 illustrates a graph management system ("GMS") 100 that may be used for creating and executing processing graphs 120, in accordance with the present disclosure. In the exemplary embodiment, the GMS 100 includes a graph management server 102 that is configured to execute a graph build engine 104 and a graph execution engine 106. The graph management server 102 may include or otherwise be in communication with a nodes database 110 that stores information about nodes, sub-graphs, and complete processing graphs (e.g., processing graph 120). The graph management server 102 may also include or otherwise be in communication with a programs repository 112 that stores programs (e.g., source code, programs, executables, scripts, binaries, libraries, functions, or the like) that may be referenced by nodes in the nodes database 110 or otherwise executed by the graph execution engine 106 during operation. In some embodiments, the graph management server 102 may also be in networked communication with one or more support execution resources 132 via a network 130 (e.g., an intranet, the Internet, or the like), which may be referenced or otherwise used to perform aspects of work included in the process graph 120.

In the exemplary embodiment, the graph build engine 104 is configured to construct process graphs 120. The terms "graph stitching" or "graph building" may be used herein to describe aspects of graph construction. The process graph 120 is a data structure constructed of nodes and edges connecting those nodes. Nodes within the graph 120 may represent functional components of work or process steps (e.g., functions, scripts, executables, libraries, third party service calls, remote procedure calls, application programming interface ("API") calls, or the like, collectively referred to herein as "referenced programs") that may be used to produce particular outputs that, in turn, may be provided to other nodes in the graph. These functional components may be references to programs stored in the programs repository 112 or may be programs that may be called or otherwise remotely executed on other computing resources, such as the support execution resources 132. The process graph 120 represents a complex, composite data structure that, once constructed, may be used to execute a complex data processing operation to generate a desired output based upon the ordered computations performed by the various nodes within the graph 120. Nodes, edges, and processing graph construction are described in greater detail below with respect to FIGS. 2A-3B.

In the exemplary embodiment, once the process graph 120 is constructed by the graph build engine 104 or otherwise read into memory on the graph management server 102, the graph execution engine 106 executes the process graph 120. Execution of the process graph 120 may include recursively traversing the process graph 120 starting at a root node and stepping down into children nodes as the processing of the current node commands. Children nodes may take data inputs provided by their parent node or other sources and may pass data outputs back to their parent node during or after completion of the child node processing. As such, the process graph 120 is used to orchestrate process flow control of a computational process, causing the graph execution engine 106 to step deeper into children nodes to generate outputs that may be used to pass up to higher nodes for aggregation into a final result. Execution of process graphs are described in greater detail below with respect to FIG. 4.

Exemplary Node and Sub-Graph Data Structures

Figure 2A:
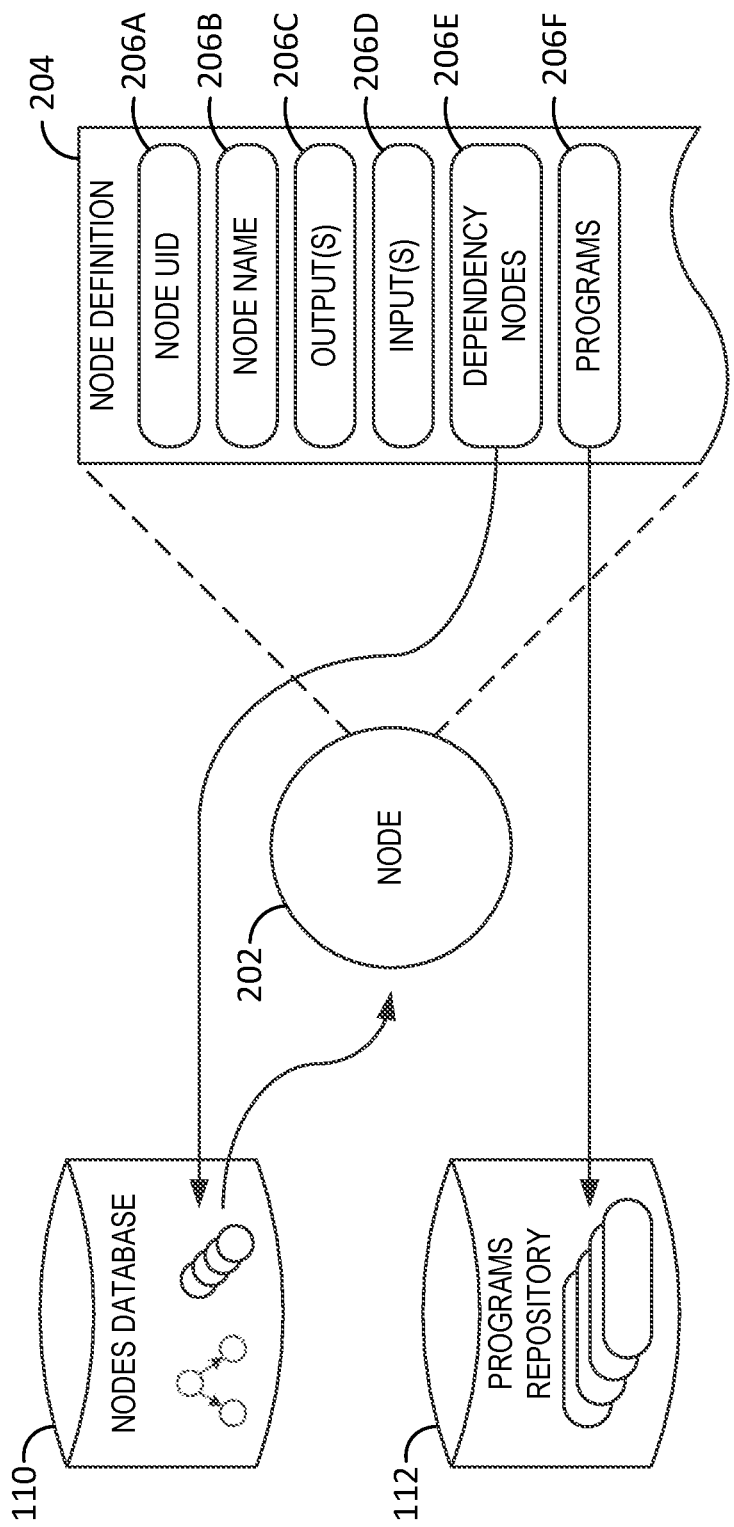
FIG. 2A illustrates an exemplary node definition data structure for a node that may appear in the processing graph and that may be stored in the nodes database shown in FIG. 1.

FIG. 2A illustrates a node definition 204 data structure for a node 202 that may appear in the processing graph 120 and that may be stored in the nodes database 110 shown in FIG. 1. In the exemplary embodiment, various nodes 202 may be configured and stored within the nodes database 110 for use by the GMS 100, where each node definition 204 is stored in the nodes database 110. Administrators may pre-configure some nodes 202 to calculate particular computations or otherwise generate particulate outputs. For example, one factor that may be used to determine policy eligibility for a driver is whether the driver has any moving violations on their record. As such, an administrator may configure the node 202 to determine a number or type of moving violations currently on the driver's record (e.g., via a public records database), compute a risk factor associated with those moving violations, or the like. This example node 202 represents some functional component of work or process step that may be used to produce that particular output (e.g., during execution of the processing graph 120 within which the node 202 appears) and may subsequently be used to build the processing graph.

The node definition 204 includes various fields 206 that may be used to configure the node 202 to control how the node 202 is processed during execution. In the exemplary embodiment, the node definition 204 includes a node UID 206A that may be used to uniquely identify this particular node definition 204 in the nodes database 110 or in a processing graph 120 or sub-graph in which that node 202 appears. The node definition 204 may also include a node name 206B or node description text (not shown) that may be used by administrators or other users to identify the node 202 or understand what function(s) the node 202 performs. The node definition 204 may also include an outputs definition 206C that identifies what data output(s) the node 202 generates and an inputs definition 206D that identifies what data input(s) the node 202 may take.

In the exemplary embodiment, some nodes 202 may be configured to depend upon other nodes 202 within the nodes database 110. For example, where the node 202 is configured to perform an overall evaluation of risk of a prospective driver due to their driver record, that node 202 may depend upon one node to determine a state driver's license number of the driver and another node to collect and return a number of speeding tickets appearing on the driver's record using that driver's license number. As such, the node definition 204 may include one or more dependency nodes 206E identifying the other nodes within the nodes database 110 upon which this node 202 depends. Dependency nodes 206E represent links to those referenced nodes and may include a node UID 206A of those dependent nodes. During graph build, such dependency nodes 206E may be integrated into the processing graph 120 as children nodes of this example node 202.

In the exemplary embodiment, the node definition 204 also includes one or more programs 206F. The program(s) 206F embody the functional operations performed by processing the node 202 itself (e.g., during graph processing). The GMS 100 may provide an embedded programming language such as a scripting language, a compiled programming language, or the like, that may be used to configure processing operations, and an administrator or programmer may configure one or more programs to perform some pre-configured tasks, control processing flow of execution of the node 202, perform some computations or the like using the embedded programming language.

In some embodiments, some programs 206F may be configured to reference other local programs such as functions, scripts, executable binaries, libraries, or the like, as programs locally stored on or otherwise executable by the graph management server 102. These local programmatic references may be stored in the programs repository 112 (e.g., within local file systems, libraries, databases, or the like) for access and execution by the graph management server 102 and the program 206F entry in the node definition 204 may reference the target local programmatic reference (e.g., via filesystem path, local service, local port, or the like). In some embodiments, the node 202 may be configured to reference external programs such as cloud services, API services, third party services, Internet-based services, or other like network-based services (e.g., via network 130) running on other computing devices such as the support execution resources 132. Each of these embedded programs, local programs, and external programs identified by the programs 206F are collectively referred to herein as "referenced programs."

Figure 2B:
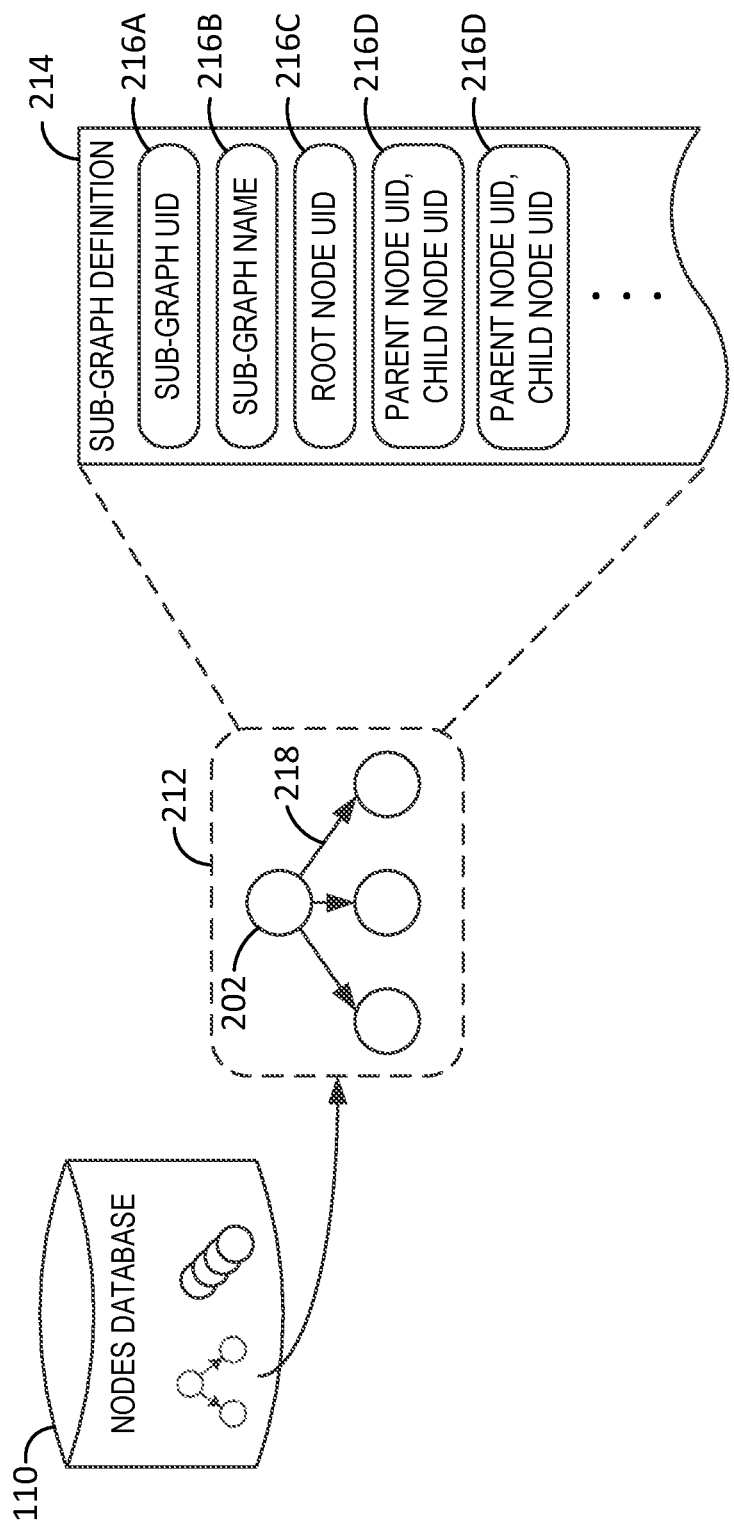
FIG. 2B illustrates an exemplary sub-graph definition data structure for a sub-graph that may appear in the processing graph and that may be stored in the nodes database shown in FIG. 1.

FIG. 2B illustrates a sub-graph definition 214 data structure for a sub-graph 212 that may appear in the processing graph 120 and that may be stored in the nodes database 110 shown in FIG. 1. In the exemplary embodiment, various sub-graphs 212 may be configured and stored within the nodes database 110 for use by the GMS 100. Administrators may pre-configure some groups of nodes 202 into a sub-graph 212 to calculate particular computations or otherwise generate particulate outputs. Each sub-graph 212 includes a number of nodes 202 connected by edges 218 to form the sub-graph 212. For example, in addition to creating and storing the individual example nodes described above with respect to FIG. 2A, the nodes database 110 may store a sub-graph of relations between the nodes used to analyze a driver's history moving violations. This example sub-graph 212 represents a composite functional component of work or process step that executes multiple nodes to produce a particular output.

The sub-graph definition 214 includes various fields 216 that may be used to configure the sub-graph 212. In the exemplary embodiment, the sub-graph definition 214 includes a sub-graph UID 216A that may be used to uniquely identify this particular sub-graph definition 214, as well as a sub-graph name 216B or sub-graph description (not shown) that may be used to may be used by administrators or other users to identify the sub-graph 212 or to document what function(s) the sub-graph 212 performs. The sub-graph definition 214 may also include a root node UID 216C. The sub-graph 212 may include a single root node that is the highest node of the sub-graph 212. The node 202 referenced by this root node UID 216C becomes the root node of the sub-graph 212 when building the sub-graph 212 in memory or otherwise integrating the sub-graph 212 into another processing graph 120. The sub-graph definition 214 may also include one or more edge entries 216D.

Edge references 216D define a relationship between two nodes, a parent node and a child node. Each edge reference identifies a parent node UID of the edge and a child node UID of that edge. As such, all of the nodes 202 included in the sub-graph 212 are identified by either the root node UID 216C or one or more of the edge references 216D, and each edge 218 and edge direction of the sub-graph 212 is identified by the edge references 216D. In some situations, the sub-graph definition 214 may not generate a complete graph. For example, the sub-graph definition 214 may reference a node that references one or more dependency nodes that are not included in the sub-graph definition 214. In such situations, the missing dependency nodes may be added to the sub-graph 212 during graph build.

Exemplary Graph Build

Figure 3A:
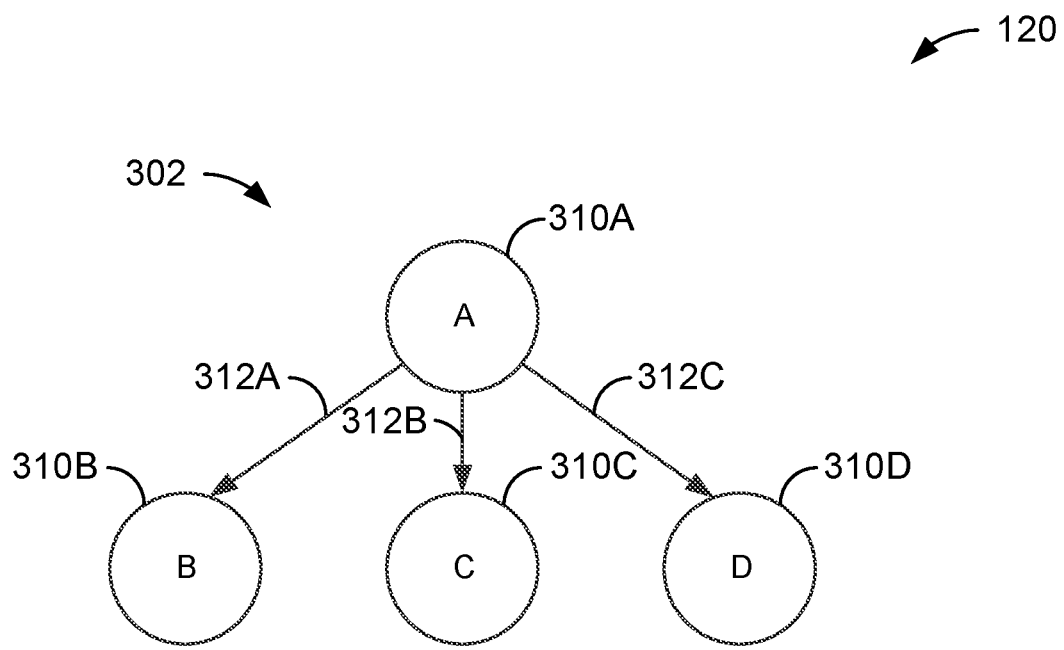
FIGS. 3A and 3B illustrate an exemplary graph build process for the example processing graph that may be performed by the graph build engine shown in FIG. 1.
Figure 3B:
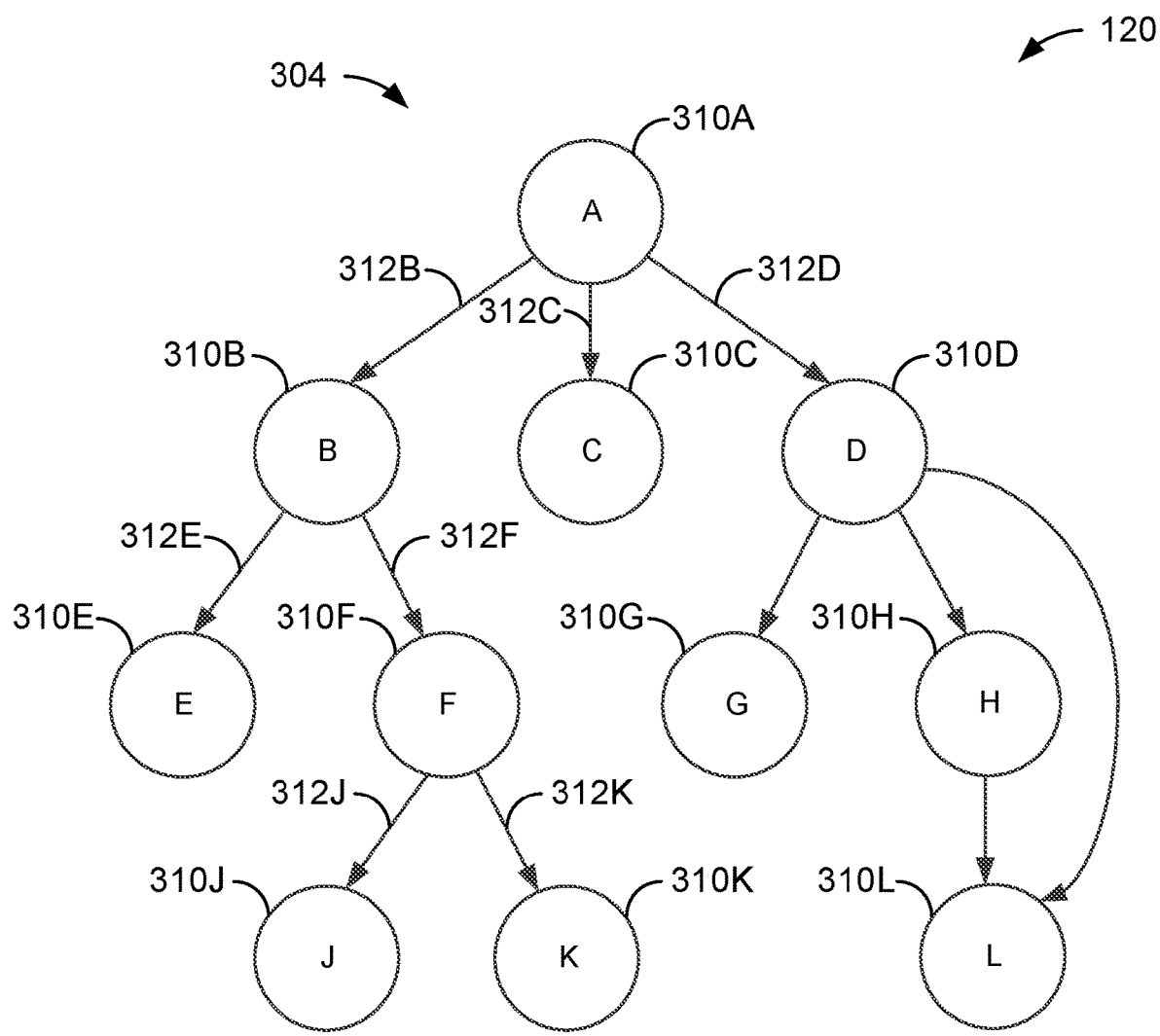

FIGS. 3A and 3B illustrate a graph build process for the example processing graph 120 that may be performed by the graph build engine 104 shown in FIG. 1. In this example, FIG. 3A illustrates a sub-graph 302 that has been pre-configured and stored in the nodes database 110 (e.g., as a sub-graph definition 214) and that has been identified by an administrator as the root of the processing graph 120. As such, the graph build engine 104 loads the sub-graph 302 into memory to begin the graph build process.

The sub-graph 302 includes a sub-graph definition 214 that identifies the node 310A as the root node of the sub-graph 302, and thus the root node of the processing graph 120. Further, sub-graph definition 214 also identifies three edges 312A, 312B, 312C, each parented by the root node 310A, and each identifying a child node 310B, 310C, and 310D, respectively. Each of the nodes 310 are present in the nodes database 110 and, as described above, each node includes a respective node definition 204 that identifies programs and perhaps other dependency nodes. As such, the sub-graph 302 represents a starting point for traversal and automatic graph building process performed by the graph build engine 104.

In other embodiments, the GMS 100 may allow a user to initiate the graph build process by identifying a root node and providing initial parameters or data inputs to be used to build or execute a processing graph 120. For example, the administrator may identify the node 310A as the root node of the graph 120 and the graph build engine 104 may identify the children nodes 310B, 310C, 310D and associated edges 312 based upon the node definition 204 of node 310A.

In the exemplary embodiment, the graph build engine 104 may generate the processing graphs as a DAG, where each edge 312 is a directed edge pointing from a parent node to a child node within the processing graph 120, and where this edge relationship defines a dependency of the parent node on the child node (e.g., the directed edge 312 pointing deeper into the graph to initiate additional processing). The directed edges 312 may also define a data flow of inputs from the parent node to the child node (e.g., in the direction of the directed edge), as well as a data flow of outputs from the child node up to the parent node (e.g., in the opposite direction of the directed edge). Further, the acyclic nature of a DAG causes the graph to be non-circular. In other words, graph traversal may only visit and process each node in the graph once.

FIG. 3B illustrates a complete processing graph 304 after the build engine 104 has completed the automatic graph build process. In the exemplary embodiment, the graph build engine 104 recursively traverses the initial graph 302 shown in FIG. 3A. The traversal may be a depth-first traversal. Upon visiting each node 310, the graph build engine 104 accesses the node definition 204 for the current node and determines whether the current node references any children nodes that are not yet integrated into the graph 304. For example, when the graph build engine 104 visits the node 310B, the graph build engine 104 determines that the node 310B references two dependency nodes 310E and 310F. As such, the graph build engine 104 adds nodes 310E and 310F to the processing graph 304, as well as their respective directed edges 312E, 312F, connecting to the parent node, node 310B. As the graph build continues, the graph build engine 104 traverses to node 310E and retrieves the associated node definition 204 for that node 310E. In this example, the node 310E references no dependency nodes 206E and, as such, the node 310E may be marked as a leaf node and traversal may recurse back to node 310B and down to the next unvisited child node 310F.

Upon visiting node 310F, the graph build engine 104 traverses to node 310F and retrieves the associated node definition 204 for that node 310F. In this example, node 310F identifies two dependency nodes 206E. As such, the graph build engine 104 looks up the child nodes 310J, 310K and their respective node definitions 204 and adds those nodes 310J, 310K and respective edges 312J, 312K to the graph 304. Once these dependency nodes have been added to the graph 304, the graph build engine 104 may continue traversing the graph 304 looking for nodes 310 with other dependency nodes 206E that have not yet been added to the graph.

The traversal continues as such through each node 310 of the graph 304, adding new dependency nodes and edges as they are encountered until every node in the graph 304 has been visited. Once the last of the nodes 310 has been visited, the processing graph 304 becomes complete, and each path through the graph 304 should terminate in a leaf node.

In some embodiments, the GMS 100 may allow the complete processing graph 304 to be saved in the nodes database 104. Users may also use the admin GUI to, for example, inspect aspects of the processing graph 304, edit the structure or composure of the processing graph 304, add, edit, replace, or delete nodes 310 within the processing graph 304, or submit the processing graph 304 or any sub-graph within the processing graph 304 for execution ("execute the graph").

Exemplary Graph Execution

Figure 4:
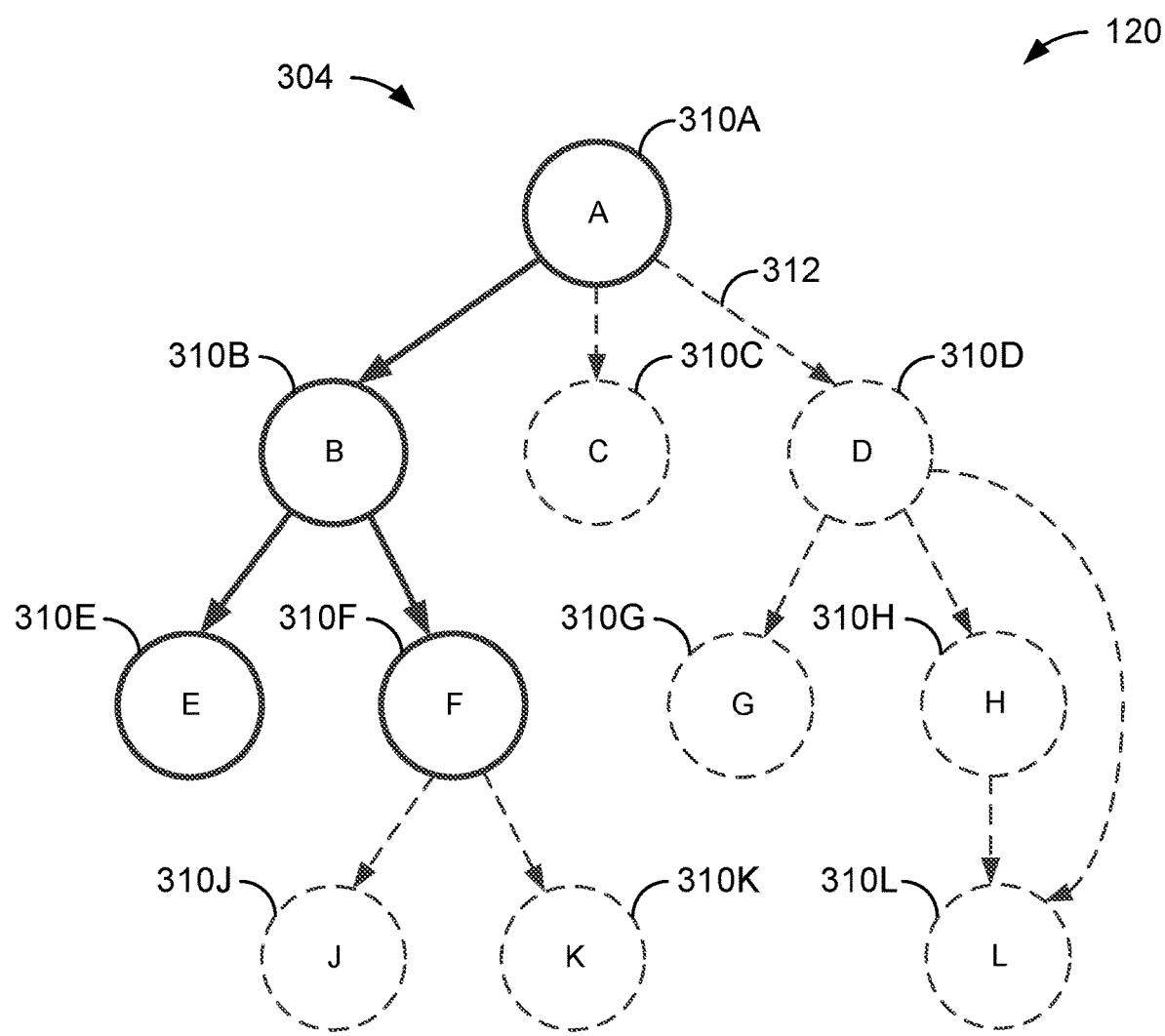
FIG. 4 illustrates execution of the processing graph as performed by the graph execution engine shown in FIG. 1.

FIG. 4 illustrates execution of the processing graph 304 as performed by the graph execution engine 106 shown in FIG. 1. In the exemplary embodiment, the graph execution engine 106 is used by the GMS 100 to execute the complete processing graph 120. Once the processing graph 304 is completely built, the administrator may submit the graph 304 for execution. During graph execution, the execution engine 106 may perform a recursive traversal of the processing graph 304 starting at the root node 310A of the graph 304. Each visit to a node 310 of the graph causes the graph execution engine 106 to execute any referenced program(s) of that current node and, for any children nodes of the current node, may cause the graph execution engine 106 to traverse to that child node for deeper node execution.

In the exemplary embodiment, execution of the initial root node 310A of the graph may include receiving or otherwise acquiring input parameters for the root node. In some embodiments, the administrator may configure or otherwise provide input parameters through the admin GUI. Further, traversing from a parent node to a child node may include passing input data to the child node, and returning from a child node to a parent node may include passing output data from the child node to the parent node. As such, execution of each particular node may utilize input data received from a parent of that current node or output data received from any or all children nodes of that current node. Where each node is configured to perform some particular calculations or other process operations, the execution of that current node and any dependent children allows the graph execution engine 106 to perform the operations for that current node and return any output data up the graph 304 to the parent of the current node.

Execution of a particular node 310, in the exemplary embodiment, may include accessing a respective node definition 204 for that current node and identifying one or more programs 206F that are used by the current node 310. For example, one node 310 may include an embedded program that collects input data passed down from its parent node and performs some preliminary processing before calling a child node.

A call to the child node may include passing input data from the current node to the child node. As such, the graph execution engine 106 may then traverse to the child node for similar execution of that child node. Upon completing execution of the child node, the child node may pass output data back to the current node, and the graph execution engine 106 may continue execution of the embedded program of the current node through to completion. Once the graph execution engine 106 completes processing of the embedded program of the current node, thereby generating output data for the current node, the current node passes output data up to the calling parent, thereby completing traversal and execution of that current node and all of its children.

In the exemplary embodiment, FIG. 4 illustrates a current state of execution traversal of the graph 304 in which node 310F is currently being visited. The state of the traversal is illustrated in FIG. 4 as solid and bolded nodes 310 and edges 312, where as-yet-unvisited nodes 310 and edges 312 are illustrated in broken line. During graph execution, the graph execution engine 106 has initially visited node 310A and stepped down into node 310B. During execution of node 310B, the graph execution engine 106 processes node 310E and receives the associated output. The graph execution engine 106 then visits the node 310F and begins processing any programs 206F referenced therein. In this current state, execution of any programs 206F of the node 310F are initiated by the graph execution engine 106 which may, subsequently, reference children nodes 310J and 310K, thereby causing the execution traversal to step down into each of the children nodes 310J, 310K and similarly process those nodes. Accordingly, the graph execution engine 106 continues traversing the processing graph and executing nodes 310 until all nodes 310 within the graph 304 have been visited and executed.

In some embodiments, the execution traversal process may include identifying one or more independent groups of unprocessed nodes that can be simultaneously processed. The graph execution engine 106 may, for example, perform a depth-first search from a particular node to identify groups of nodes that can be processed independently of the other identified groups. For example, in some configurations, the sub-graph rooted by node 310B may be independent of the sub-graph rooted by nodes 310C and 310D. In such circumstances, the graph execution engine 106 may process such independent sub-graphs simultaneously (e.g., using multiple processors), thereby allowing faster execution of the graph 304.

Exemplary Client Device

Figure 5:
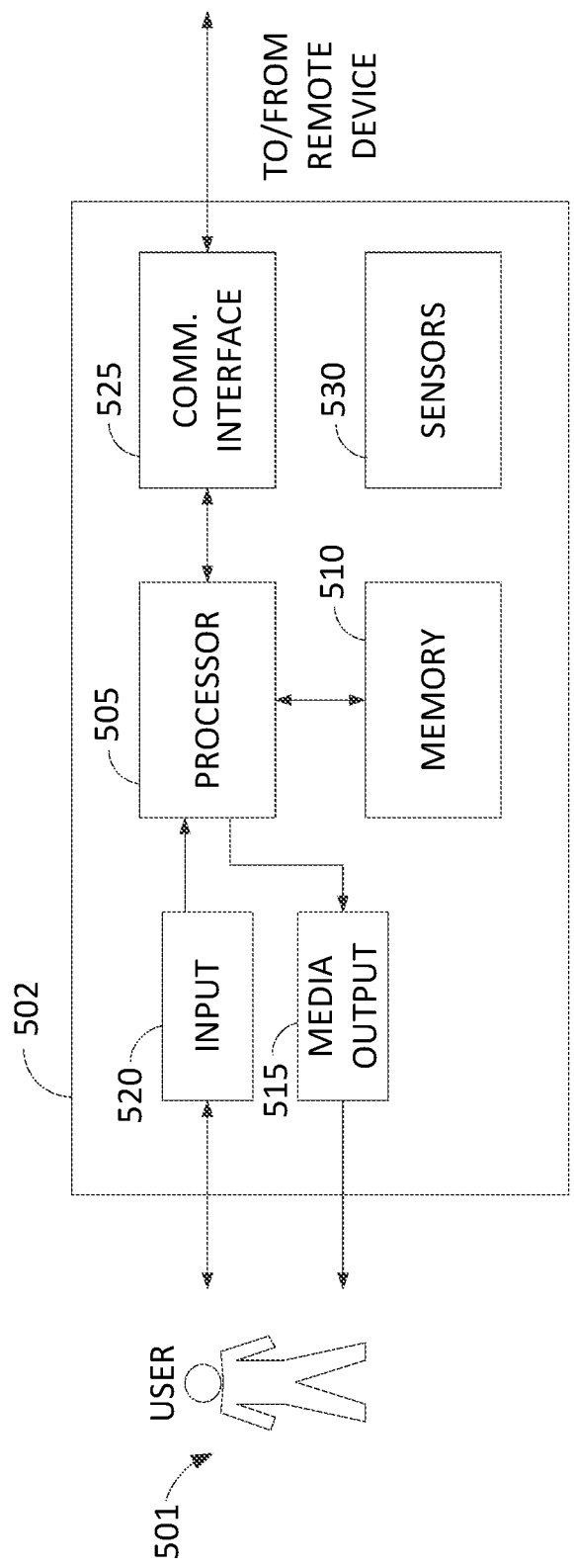
FIG. 5 depicts an exemplary configuration of user computer device, in accordance with one embodiment of the present disclosure.

FIG. 5 depicts an exemplary configuration of user computer device 502, in accordance with one embodiment of the present disclosure. In the exemplary embodiment, user computer device 502 may be operated by a user 501, such as an administrator or programmer of the GMS 100. User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an interface for viewing instructions or user prompts. In some embodiments, user computer device 502 may include an input device 520 for receiving input from user 501. User 501 may use input device 520 to, without limitation, provide information either through speech or typing.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as support execution resources 132 (shown in FIG. 1). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. A client application may allow user 501 to interact with, for example, graph management server 102, nodes database 110, programs repository 112, or support execution resources 132. For example, instructions may be stored by a cloud service, and the output of the execution of the instructions sent to the media output component 515.

Exemplary Server Device

Figure 6:
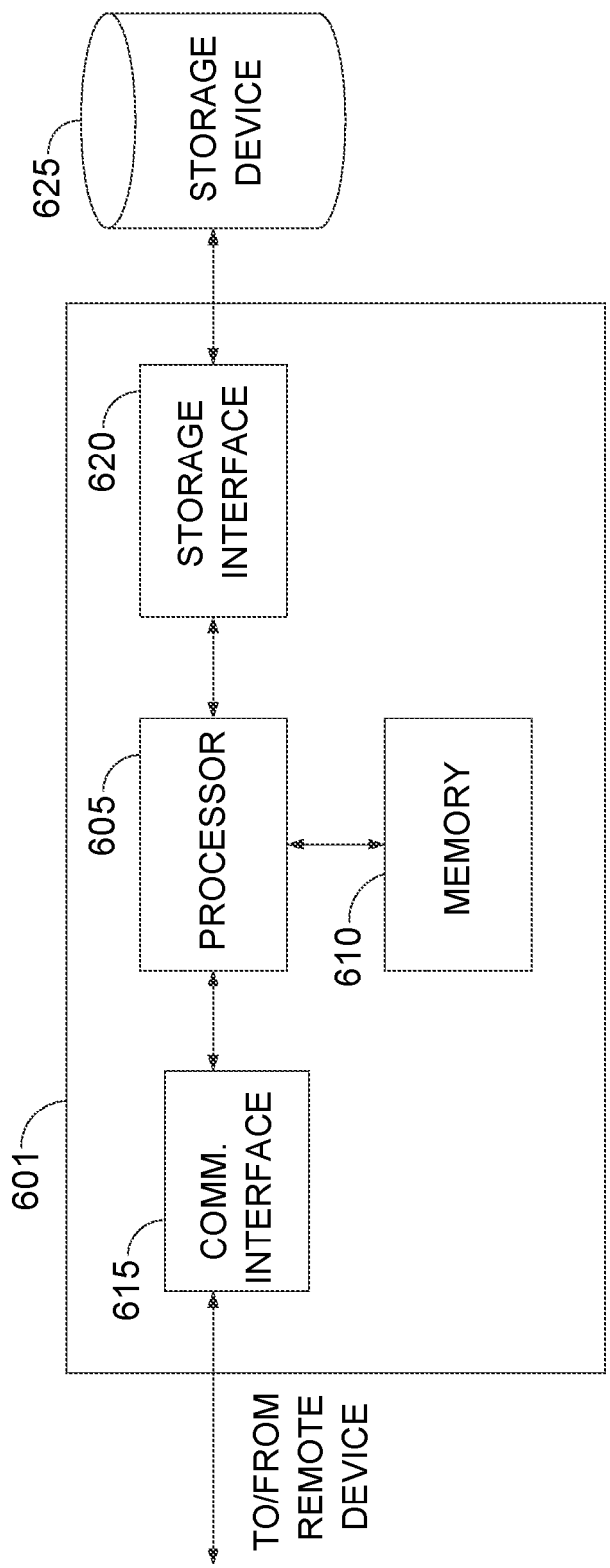
FIG. 6 depicts an exemplary configuration of a server computer device, in accordance with one embodiment of the present disclosure.

FIG. 6 depicts an exemplary configuration of a server computer device 601, in accordance with one embodiment of the present disclosure. In the exemplary embodiment, server computer device 601 may be similar to, or the same as, graph management server 102 (shown in FIG. 1). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, support execution resources 132, and user computer devices 501 (shown in FIG. 5) (for example, using wireless communication or data transmission over one or more radio links or digital communication channels). For example, communication interface 615 may receive requests from user computer devices 501 via the network 130.

Processor 605 may also be operatively coupled to a storage device 625. Storage device 625 may be any computer-operated hardware suitable for storing and/or retrieving data, such as, but not limited to, nodes database 110 and programs repository (shown in FIG. 1). In some embodiments, storage device 625 may be integrated in server computer device 601. For example, server computer device 601 may include one or more hard disk drives as storage device 625.

In other embodiments, storage device 625 may be external to server computer device 601 and may be accessed by a plurality of server computer devices 601. For example, storage device 625 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIG. 1.

Exemplary Graph Build

Figure 7A:
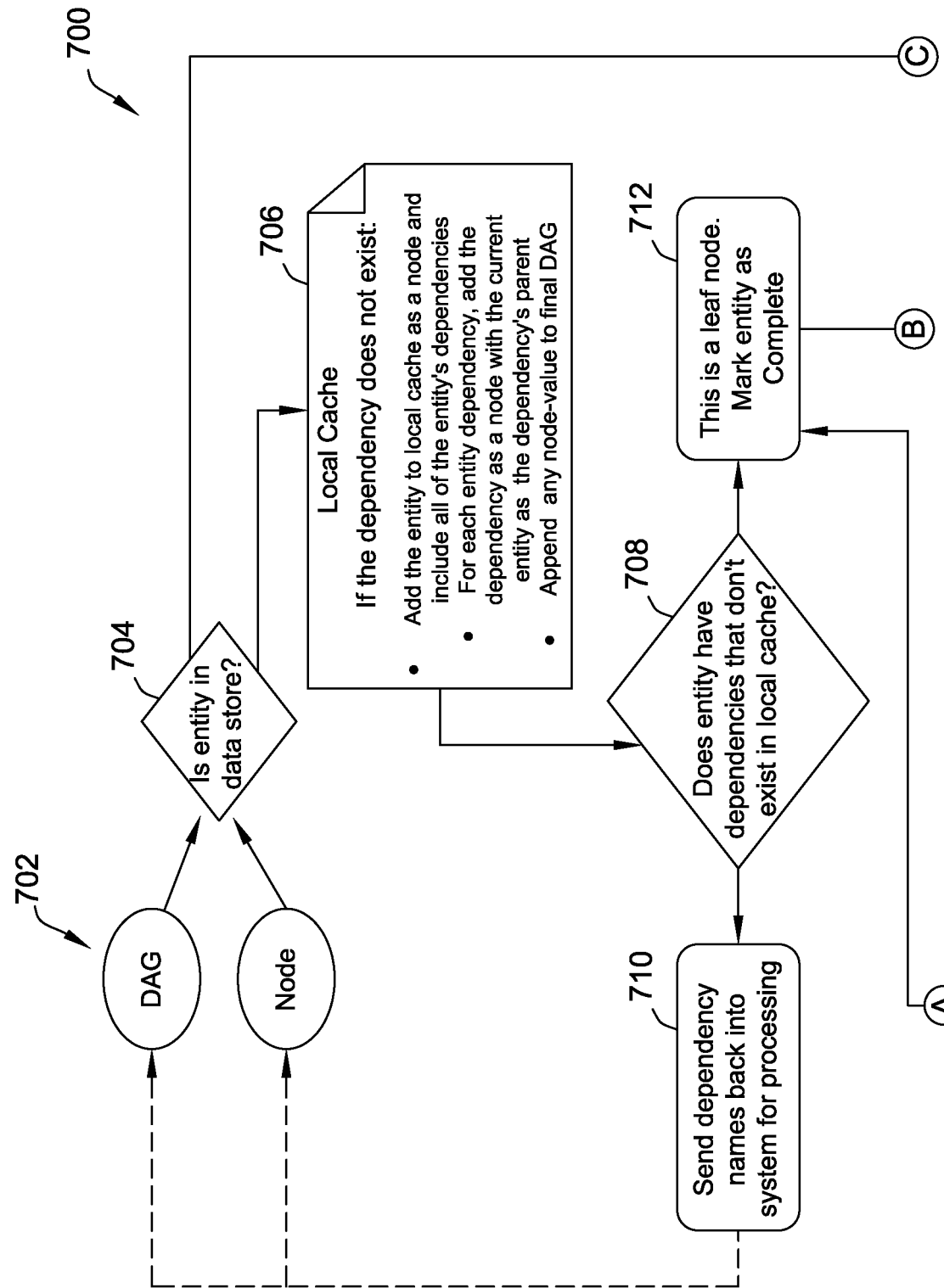
FIGS. 7A and 7B illustrate an exemplary recursive graph build process that may be performed by the graph build engine to build the processing graph shown in FIG. 1.
Figure 7B:
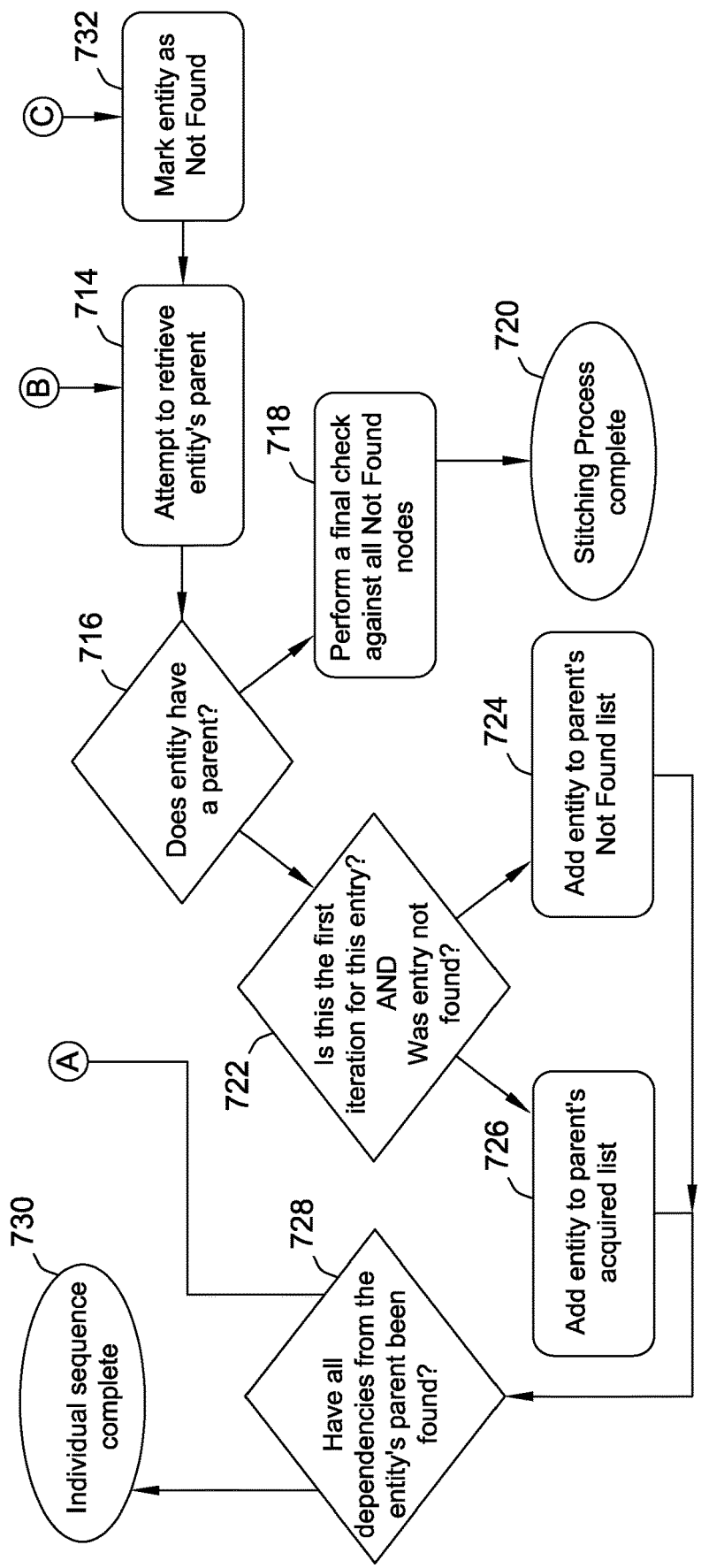

FIGS. 7A and 7B illustrate a recursive graph build process 700 that may be performed by the graph build engine 104 to build the processing graph 120 shown in FIG. 1. In the exemplary embodiment, the graph process 700 begins with a node or a sub-graph ("DAG") at 702. If, at test 704, the entity is not in the data store (e.g., the nodes database 110), then the graph build engine 104 marks 732 the entity as no found and continues to operation 714. When a particular node is not found in the nodes database 110 or is otherwise not defined, then the graph build engine 104 may generate an error and may be configured to terminate the graph build process 700 or may be configured to continue the build process 700 without the unfound node (e.g., installing a placeholder node where the unfound node was to occur in the graph 120). At a later time, the absence of the missing node may be corrected, such as by addition of the missing node to the nodes database 110, editing of the parent of that missing node to avoid relying upon the missing node, or through construction of a custom node to stand in for the missing node (e.g., returning a default value or the like). In some situations, an administrative user may use the admin GUI to manage the missing nodes in a constructed graph or sub-graph and may inspect and may manually correct the missing node situation in the graph 120.

If, at test 704, the entity is found in the data store, and if the entity does not already exist in the processing graph 120, then the entity is added as a node to the graph 120, as well as all of the entity's dependent nodes and their respective edges. For each dependency of the added node, the graph build engine 104 may add the dependency node as a child node to the entity within the graph 120 and may append any node-value to the processing graph 120.

In the exemplary embodiment, if, at test 708, the entity has dependencies that do not exist in the local cache, then the graph build engine 104 sends 710 dependency names back into the graph build process 700 for recursive addition of such nodes or sub-graphs. If, at test 708, the entity does not have any dependencies that do not exist in local cache, then the current node is marked 712 as a leaf node and completed. The graph build engine 10 attempts 714 to retrieve the current entity's parent node. If, at test 716, the current entity is determined to not have a parent node, then the graph build engine 104 performs 718 a final check against all non-found nodes and completes 720 the graph build process. If, at test 716, the current entity does have a parent, then the process 700 continues on to test 722. If, at test 722, this is the first iteration for this entity and the entity was not found, then the graph build engine 104 adds 724 the entity to the parent's not found list. Otherwise, the graph build engine 104 adds 726 the entity to the parent's acquired list. If, at test 728, all dependencies from the entity's parent been found, then this is a leaf node that is marked as complete. Otherwise, the individual sequence is complete 730.

The graph build process 700 may include additional, less, or alternate functionality, including that discussed elsewhere herein.

Exemplary Tiered Graphs

Figure 8:
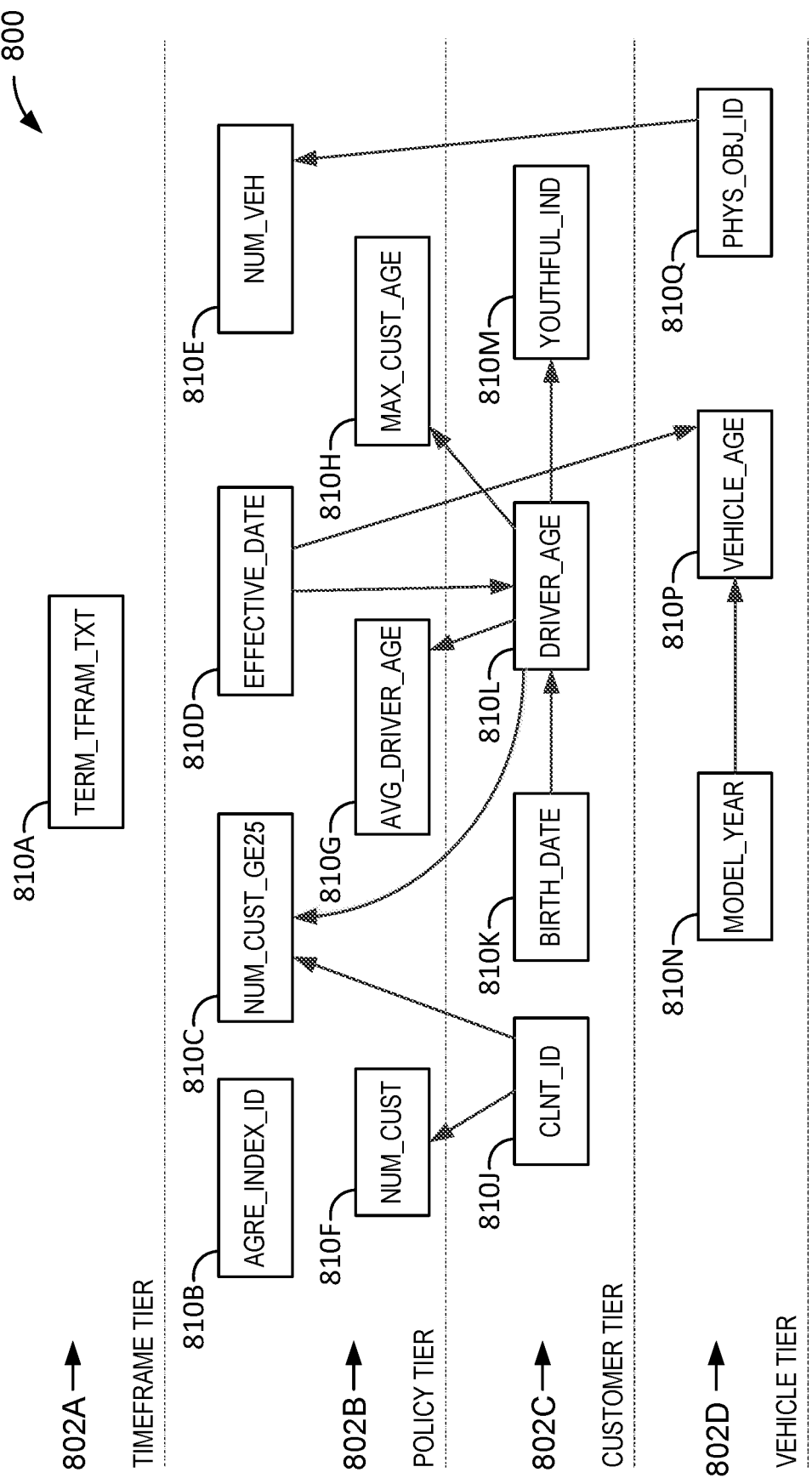
FIG. 8 illustrates an exemplary processing graph that may be built or executed by the GMS shown in FIG. 1.

FIG. 8 illustrates an exemplary processing graph 800 that may be built or executed by the GMS 100 shown in FIG. 1. One problem that may be addressed by the GMS 100 is to perform some complex (e.g., composite) calculations that may be an aggregation of processing multiple parts or sub-parts before a result of interest can be determined. For example, the GMS 100 may include a repository of computations that can be used to determine, for example, a "driver-age" for various drivers that may be covered by particular automobile insurance policies. Such a determination may involve processing of multiple different elements or sub-elements to reach the final result (e.g., to determine the driver-age of a particular driver). Further such determinations may need to be performed for thousands of drivers, each having their own particular inputs. The GMS 100 orchestrates these computations such that the elements of the process are traceable (e.g., for a given element X, the GMS 100 can identify other elements that use X, or other elements that feed into X). These computational elements may be represented herein as the nodes of graphs, with the relationships between those nodes being defined by the edges between the nodes of the graph. Further, some elements may be shared across multiple areas (e.g., where X may be used for rating and for underwriting automobile insurance policies, fire insurance policies, or the like). The GMS 100 provides tools and utilities that allow easy lookup of metadata for how a particular element, X, is calculated (e.g., via GUI viewing of a graph for determining X, viewing nodes or node details of nodes in the graph). These tools allow administrators to easily add new elements or edit existing elements. Such elements and their associated graphs may be used in simulation (e.g., in modeling scenarios) or in real-world operation (e.g., in actual policy rating or underwriting), and may allow the ability to target the calculations of particular elements. Such benefits provide various computational processing efficiencies as well as manpower efficiencies over conventional techniques, including, for example, reduction in memory consumption (e.g., via loading into volatile memory only the nodes/graphs and their associated code/computations needed for the particular calculation), reusability of code (e.g., leveraging elements across various use cases), and accuracy in simulation (e.g., using the same graphs and elements for simulation as is used in production).

In the exemplary embodiment, the graph 800 is a directed acyclic graph having multiple levels (or tiers) 802. The processing graph 800 may be similar to the processing graph 120, and may be built or processed by the graph processing server 102 (e.g., via the graph build engine 104, the graph execution engine 106). In this example, the graph 800 is designed to process ratings or underwriting for automobile insurance policies. For example, the graph 800 includes element definitions (e.g., as various nodes 810 of the graph 800), where each element definition represents a data element and the edges represent the data flow direction. It should be understood that the edges of graph 800 in FIG. 8 are represented in an opposite direction of the graphs shown in FIGS. 1-4 for purposes of illustrating and discussing which nodes provide data for other nodes. In this example use case, the graph 800 includes a timeframe tier 802A, a policy tier 802B, a vehicle tier 802C, and a customer tier 802D, and the relationship between connected nodes 810 defines processing aspects between those nodes.

During operation, the graph processing server 102 uses the graph 800 to perform the composite processing and generate the target outcome, such as a rating. The process of performing the graph 800 may include receiving a set of inputs, illustrated here as tables of data, where each table includes one or more columns of data (e.g., with a column name identifying the nature of data stored in that column) as well as zero or more rows of data (e.g., providing a data record containing values for any or all of the columns). Further, some of the various example tables of data may be defined per tier 802. For example, the input data may include a policy-level table:

TABLE 1

Policy-Level Table

| term_tframe_txt | agre_index_id | effective_date |
|---|---|---|
| Current | P1 | 2020 Jan. 1 |
| Prior | P1 | 2018 Jul. 1 |

The data in the example policy-level table includes data identifying a "Current" policy and a "Prior" policy for an example customer (e.g., a family), an "agre_index_id," and an associated effective date for each policy. In this example, the customer had a prior policy effective from 1 Jul. 2018 until 1 Jan. 2020, at which time a current policy became effective. Further, the input data may include a customer-level table:

TABLE 2

Customer-Level Table

| term_tframe_txt | agre_index_id | clnt_id | birth_date |
|---|---|---|---|
| Current | P1 | C1 | 1980 Mar. 14 |
| Current | P1 | C2 | 1979 Nov. 3 |
| Current | P1 | C3 | 2003 Dec. 17 |
| Prior | P1 | C1 | 1980 Mar. 14 |
| Prior | P1 | C2 | 1979 Nov. 3 |

The data in the example customer-level table includes data associated with the drivers covered by the current and prior policies for the example customer, including a row for each unique driver covered by the policy (uniquely identified by "clnt_id") and their associated date of birth. In this example, the prior policy included two drivers, C1 and C2, where the current policy covers a total of three drivers, C1, C2, and C3. The input data may also include a vehicle-level table:

TABLE 3

Vehicle-Level Table

| term_tframe_txt | agre_index_id | phys_obj_id | model_year |
|---|---|---|---|
| Current | P1 | V1 | 2017 |
| Current | P1 | V2 | 2008 |
| Current | P1 | V3 | 2020 |
| Prior | P1 | V1 | 2017 |
| Prior | P1 | V2 | 2008 |

The data in the example vehicle-level table includes data associated with the vehicles covered by the current and prior policies for the example customer, including a row for each unique vehicle covered by the policy (uniquely identified by "phys_obj_id") and their associated model year. In this example, the prior policy covered two vehicles, V1 and V2, where the current policy covers a total of three vehicles, V1, V2, and V3. It should be understood that numerous other data elements may be provided in such tier tables and additional or different tier tables may be provided, and that such tables as described above are provided for purpose of illustration.

In the exemplary embodiment, the tier tables provide data that is used during processing of the graph 800. For example, the graph processing server 102 may use the various data from the tier tables as inputs to rating models when determining a policy rating for the customer. Such inputs may be provided in a hierarchical format and the graph processing server 102 may parse the input into these example tier tables.

During processing, and in addition or alternative to the processing flow described above with respect to FIGS. 1-4, the graph processing server 102 may use the tier tables based upon how nodes 810 within the graph 800 are connected. In the exemplary embodiment, each edge in the graph 800 is a directed edge pointing from a starting node to an ending node. As mentioned above, in FIG. 8, the edges illustrate direction of data flow. For example, the vehicle_age node 810P uses data from the effective_date node 810D and from the model_year node 810N. In the exemplary embodiment, the relative tiers 802 within which each node 810 of a connection (e.g., an edge) occurs may impact how the related nodes 810 use data from the tier tables. In some scenarios, two connected nodes share the same tier (referred to herein as a "lateral connection" of "cohabitating nodes"). For example, the model_year node 810N and the vehicle_age node 810P are cohabitating nodes, as they both share the vehicle tier 802B. In other scenarios, two connected nodes occupy different tiers (referred to herein as a "cross-tier connection" of "disparate nodes"). Some cross-tier connections provide data flow from a lower tier to a higher tier (referred to herein as an "ascending cross-tier connection," or just "ascending connection"), where other cross-tier connections provide data flow from a higher tier to a lower tier (referred to herein as a "descending cross-tier connection," or just "descending connection"). For instance, the edge connecting the effective_date node 810D and the vehicle_age node 810P are connected in a descending cross-tier connection, as the vehicle_age node 810P accepts data from the effecive_date node 810D, which illustrates data flowing from a higher tier (e.g., the policy tier 802B) to a lower tier (e.g., the vehicle tier 802D). In another example, the edge connecting the driver_age node 810L and the avg_driver_age node 810G illustrates data flowing from a lower tier (e.g., the customer tier 802C) to a higher tier (e.g., the policy tier 802B), and thus this connection is an ascending cross-tier connection. Each scenario provides distinct data matching relative to the relative tiering.

For example, consider the following tier tables for the policy level 802B, customer level 802C, and vehicle level 802D in conjunction with the example graph 800:

TABLE 4

Example Policy-Level Table

| pol-num | state | effective_date |
|---|---|---|
| P1 | 35 | 2020 Jan. 1 |
| P2 | 35 | 2019 Oct. 5 |

TABLE 5

Example Customer-Level Table

| pol-num | clnt-id | gender | birth_date |
|---|---|---|---|
| P1 | C1 | M | 1980 Jan. 1 |
| P1 | C2 | F | 1978 Jan. 1 |
| P1 | C3 | F | 2000 Jan. 1 |
| P2 | C1 | M | 1980 Jan. 1 |
| P2 | C2 | F | 1978 Jan. 1 |

TABLE 6

Vehicle-Level Table

| pol-num | phys-obj-id | make | model_year |
|---|---|---|---|
| P1 | V1 | Toyota | 2005 |
| P1 | V2 | Toyota | 1999 |
| P1 | V3 | Ford | 1960 |
| P2 | V4 | Honda | 2015 |
| P2 | V5 | Honda | 2020 |

To illustrate data flow with cohabitating nodes, consider the relationship between the model_year node 810N and the vehicle_age node 810P, and where a definition of "model-year-ge2000" is used to determine whether a particular vehicle's model year is greater than or equal to the year 2000:

:model-year-ge2000
{:arguments [:model-year]
 :function ind-→=2000
 :level vehicle-level}

In this situation, the vehicle_age node 810P takes data for model_year from the same row. For example, the model-year-ge2000 provided for vehicle "V1," which has a model_year=2005, returns a "1" (e.g., a logical TRUE) because V1 has a model_year greater than or equal to 2000, and returns a "0" (e.g., a logical FALSE) for vehicle "V2" because the model_year=1999, which is less than 2000. Such may be performed for any or all of the vehicles in the Vehicle-Level Table 6, and may be added (e.g., as a new column) to Table 6.

For descending connections, consider the relationship between the driver_age node 810L and the effective_date node 810D, and where a definition of "driver_age" (e.g., driver age) is used to determine a customer's age:

:driver-age
{:arguments [:eff-date:birth-date]
 :function calc-years
 :level customer-level}

In this situation, the driver_age node 810L is a lower-level node than the effective_date node 810D, and thus is configured to inherit data from the Policy-Level Table 4 (e.g., the eff-date field) based upon a shared key of pol-num. In other words, for rows of the Customer-Level Table 5, customer-age uses the eff-date field from pol-num="P1" of the Policy-Level Table 4 as the argument for calc-years (e.g., using pol-num as the shared key). For example, calc-years for driver C1 under policy with pol-num="P1" (e.g., the first row of the Customer-Level Table 5), the eff-date of "2020-01-01" is extracted from the Policy-Level Table 4 to determine that the driver_age of the driver at the time of that effective date is 40 years old. Additionally, when the driver_age for that same driver "C1" under policy "P2" (e.g., the previous policy for this family) pulls the eff-date of 2019 Oct. 5 from the Policy-Level Table 4 to determine that the driver_age of the driver at the time of that effective date is 39 years old.

For ascending connections, consider the relationship between the num_veh node 810E and the phys_obj_id node 810Q, and where a definition of "num-vehicles" is used to determine a number of vehicles for a given policy:

:num-vehicles
{:arguments [:phys-obj-id]
 :function count-dist
 :level policy-level}

In this situation, the num_veh node 810E is at a higher level than the phys_obj_id node 810Q, and thus is configured to summarize data from the Vehicle-Level Table 6 based upon a shared key of pol-num. For example, count-dist generates a vector of data for policy pol-num="P1" from the Vehicle-Level Table 6, which provides a vector [V1 V2 V3] to determine num-vehicles=3 for that policy in the Policy-Level Table 4. Similarly, count-dist generates another vector of data for policy pol-num="P2" from the Vehicle-Level Table 6, which provides a vector [V4 V5] to determine num-vehicles=2 for that policy.

In some situations, cohabitating nodes are at the same tier but need data from other rows. For example, consider a definition for determining a number of drivers older than a particular driver:

:drivers-older-than-me
{:arguments [:phys-obj-id
  {:element:customer-age
   :return:other-rows
   :match-on [:pol-num] }]
 :function count-older
 :level customer-level}

Here, an array is created with other driver ages in the same policy in order to determine how many drivers on that policy are older than a particular driver on that policy. For example, for a driver clnt-id="C1" on the first policy pol-num="P1", the driver-age for that driver is 40 and the array of other drivers on that policy is [42 20]. As such, drivers-older-than-me for that driver is 1. Additionally, for driver clnt-id="C3", the driver-age for that driver is 20 and the array of other drivers on that policy is [42 40]. As such, drivers-older-than-me for that driver is 2.

Example Graphical User Interface

Figure 9:
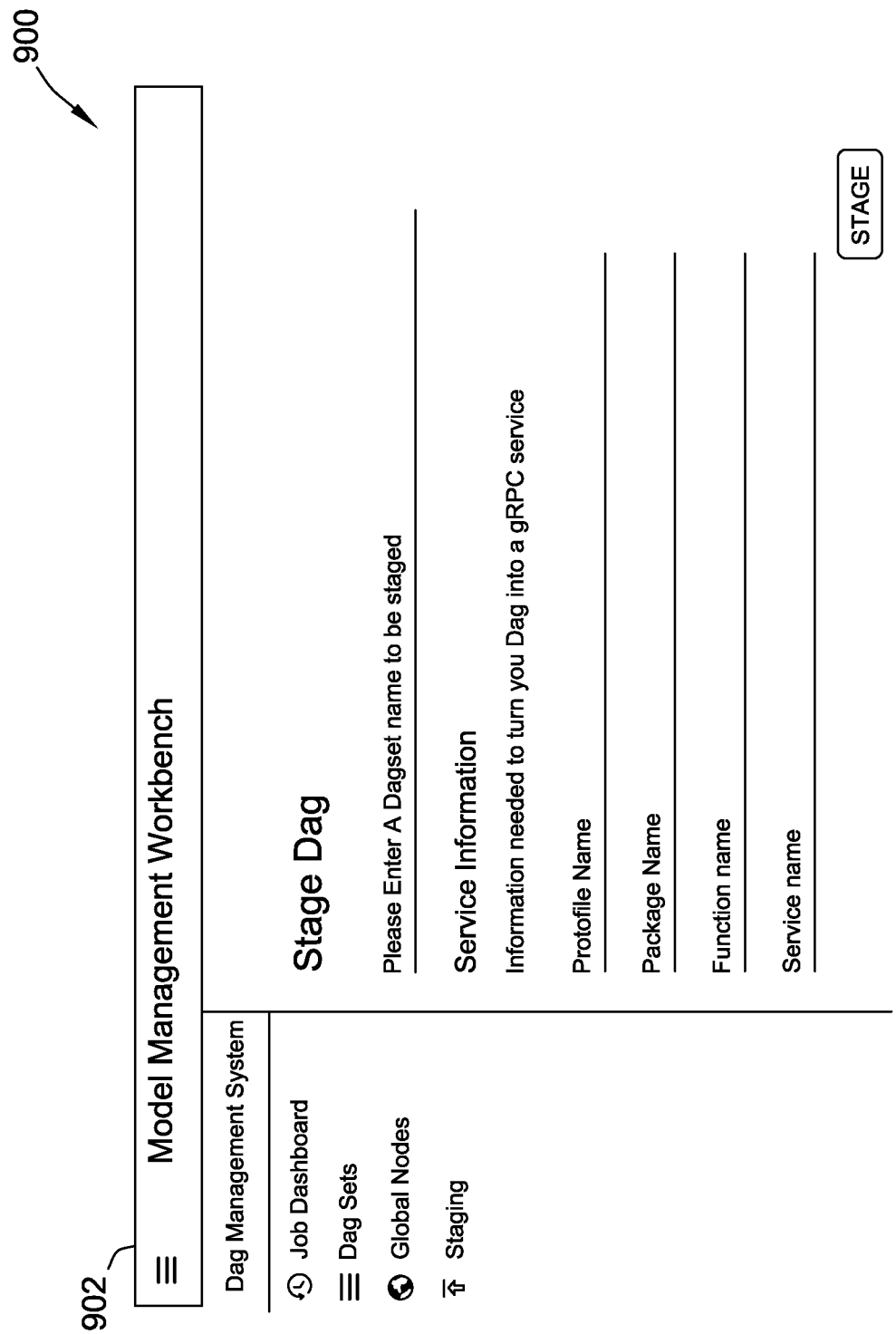
FIG. 9 illustrates an exemplary staging view of a graphical user interface provided by the GMS shown in FIG. 1 that allows users to stage a graph (e.g., a "DAG").

FIGS. 9-12 illustrate various example views of an example graphical user interface ("GUI") 902 that may be provided by the GMS 100. In the exemplary embodiment, the GMS 100 may provide the GUI 902 to allow users (e.g., process administrators, programmers, or the like) to configure and administer aspects of processing graphs, such as the graphs 120, 212, 302, 800 and associated nodes shown in FIGS. 1-8. FIG. 9 illustrates an exemplary staging view 900 of the GUI 902 provided by the GMS shown in FIG. 1 that allows users to stage a graph (e.g., a "DAG"). The view 900 allows the user to provide a name of a dagset to be staged, as well as a protofile name, a package name, a function name, and a service name. FIG. 10 illustrates an exemplary jobs dashboard view 1000 of the GUI 902 shown in FIG. 9 that allows users to view execution status and other information associated with executing or previously-executed graphs. In the example embodiment, the jobs dashboard view 1000 provides a run status, a dag set ID, a triggered-by field (e.g., what user initiated the execution of a graph, sub-graph, or node), a trigger time (e.g., when the execution was initiated), a not found nodes field, a stitching status field, and an image creation status field. FIG. 11 illustrates an exemplary dag sets view 1100 that provides a list of graphs or sub-graphs, along with a name of each graph, a timestamp (e.g., creation time, last edit time), and a details field (e.g., a view button that allows deeper inspection of the graph). FIG. 12 illustrates an exemplary global nodes view 1200 of the GUI 902 shown in FIG. 9 that provides a list of nodes that have been configured and saved (e.g., in the nodes database 110), along with a name of the node, a timestamp (e.g., creation time, last edit time), and a details field (e.g., a view button that allows deeper inspection of the node). The GUI may present additional views that provide various functionality, including configuring nodes and graphs, programmatic interfaces that allow code to be added to nodes or graphs, and the like.

ADDITIONAL EMBODIMENTS

In some embodiments, a computer system for creating a processing graph is provide. The computer system may include at least one processor in communication with at least one memory device. The at least one processor may be programmed to: (A) create the processing graph to include at least a plurality of nodes and one or more edges, each edge of the one or more edges connects a pair of nodes, each node of the processing graph represents a component of computation performed by at least one program referenced by that node; (B) identify a first node of the plurality of nodes within the processing graph; (C) access a first node definition of the first node from a nodes database, the first node definition identifies a dependency node, the dependency node represents a component of computation that generates output data used by the first node; (D) add a second node to the graph as a child of the first node, the second node representing the dependency node; and (E) add a first edge to the graph connecting the first node to the second node. In some embodiments, the processing graph is a directed acyclic graph, and the first edge is directed from the first node to the second node. In some embodiments, each node of the plurality of nodes includes a node unique ID (UID), and the first node definition identifies the dependency node based upon a node UID of that dependency node. In some embodiments, the first node definition includes at least one output field that identifies an output generated by the first node during execution of that node. In some embodiments, the output generated by the first node during execution of that node is passed to a parent node of the first node after execution of the first node is complete. In some embodiments, the first node definition includes at least one input field that identifies an input variable accepted by the first node during execution of that node. In some embodiments, the input variable accepted by the first node during execution of the first node is provided by a parent node of the first node prior to initiating execution of the first node. In some embodiments, the first node definition further includes a first program that is executed by the computer system during execution of the first node. In some embodiments, the first program includes source code written in an embedded programming language provided on the computer system. In some embodiments, the first program includes a reference to a local program stored on a storage device local to the computer system. In some embodiments, the local program is one or more of a reference to a script file, an executable binary file, a local library of functions, and a local service. In some embodiments, the first program includes a reference to an external program performed by another computer system. In some embodiments, the first program is one or more of a reference to a cloud service, an application programming interface (API) service, a third party service, and a network-based service. In some embodiments, the at least one processor is further configured to recursively traverse the processing graph to identify all dependency nodes that are not yet included in the processing graph and add all of the dependency nodes to the processing graph. In some embodiments, the at least one processor is further configured to execute the processing graph, wherein executing the processing graph includes traversing the processing graph until each node in the processing graph has been executed.

In some embodiments, a computer-implemented method for creating a processing graph is provided. The method may be implemented by a computer device including at least one processor in communication with at least one memory device. The method may include: (A) creating the processing graph to include at least a plurality of nodes and one or more edges, each edge of the one or more edges connects a pair of nodes, each node of the processing graph represents a component of computation performed by at least one program referenced by that node; (B) identifying a first node of the plurality of nodes within the processing graph; (C) accessing a first node definition of the first node from a nodes database, the first node definition identifies a dependency node, the dependency node represents a component of computation that generates output data used by the first node; (D) adding a second node to the graph as a child of the first node, the second node representing the dependency node; and (E) adding a first edge to the graph connecting the first node to the second node. In some embodiments, the processing graph is a directed acyclic graph, and the first edge is directed from the first node to the second node. In some embodiments, each node of the plurality of nodes includes a node unique ID (UID), wherein the first node definition identifies the dependency node based upon a node UID of that dependency node. In some embodiments, the first node definition includes at least one output field that identifies an output generated by the first node during execution of that node. In some embodiments, the output generated by the first node during execution of that node is passed to a parent node of the first node after execution of the first node is complete. In some embodiments, the first node definition includes at least one input field that identifies an input variable accepted by the first node during execution of that node. In some embodiments, the input variable accepted by the first node during execution of the first node is provided by a parent node of the first node prior to initiating execution of the first node. In some embodiments, the first node definition further includes a first program that is executed by the computer system during execution of the first node. In some embodiments, the first program includes source code written in an embedded programming language provided on the computer system. In some embodiments, the first program includes a reference to a local program stored on a storage device local to the computer system. In some embodiments, the local program is one or more of a reference to a script file, an executable binary file, a local library of functions, and a local service. In some embodiments, the first program includes a reference to an external program performed by another computer system. In some embodiments, the first program is one or more of a reference to a cloud service, an application programming interface (API) service, a third party service, and a network-based service. In some embodiments, the method further includes recursively traversing the processing graph to identify all dependency nodes that are not yet included in the processing graph and add all of the dependency nodes to the processing graph.

In some embodiments, a non-transitory computer readable medium having computer-executable instructions embodied thereon for creating a processing graph is provided. When executed by at least one processor, the computer-executable instructions cause the at least one processor to: (A) create a processing graph to include at least a plurality of nodes and one or more edges, each edge of the one or more edges connects a pair of nodes, each node of the processing graph represents a component of computation performed by at least one program referenced by that node; (B) identify a first node of the plurality of nodes within the processing graph; (C) access a first node definition of the first node from a nodes database, the first node definition identifies a dependency node, the dependency node represents a component of computation that generates output data used by the first node; (D) add a second node to the graph as a child of the first node, the second node representing the dependency node; and (E) add a first edge to the graph connecting the first node to the second node. In some embodiments, the processing graph is a directed acyclic graph, wherein the first edge is directed from the first node to the second node. In some embodiments, each node of the plurality of nodes includes a node unique ID (UID), wherein the first node definition identifies the dependency node based upon a node UID of that dependency node. In some embodiments, the first node definition includes at least one output field that identifies an output generated by the first node during execution of that node. In some embodiments, the output generated by the first node during execution of that node is passed to a parent node of the first node after execution of the first node is complete. In some embodiments, the first node definition includes at least one input field that identifies an input variable accepted by the first node during execution of that node. In some embodiments, the input variable accepted by the first node during execution of the first node is provided by a parent node of the first node prior to initiating execution of the first node. In some embodiments, the first node definition further includes a first program that is executed by the computer system during execution of the first node. In some embodiments, the first program includes source code written in an embedded programming language provided on the computer system. In some embodiments, the first program includes a reference to a local program stored on a storage device local to the computer system. In some embodiments, the local program is one or more of a reference to a script file, an executable binary file, a local library of functions, and a local service. In some embodiments, the first program includes a reference to an external program performed by another computer system. In some embodiments, the first program is one or more of a reference to a cloud service, an application programming interface (API) service, a third party service, and a network-based service. In some embodiments, the at least one processor is further configured to recursively traverse the processing graph to identify all dependency nodes that are not yet included in the processing graph and add all of the dependency nodes to the processing graph. In some embodiments, the at least one processor is further configured to execute the processing graph, wherein executing the processing graph includes traversing the processing graph until each node in the processing graph has been executed.

In some embodiments, a computer system for executing a processing graph is provided. The computer system may include at least one processor in communication with at least one memory device. The at least one processor may be programmed to: (A) access a graph definition of the processing graph from a nodes database, the graph definition identifies a plurality of nodes and one or more edges, each edge of the one or more edges connects a pair of nodes of the plurality of nodes, each node of the processing graph represents a component of computation performed by at least one program referenced by that node; (B) construct the processing graph in the memory; (C) traverse the processing graph to visit and process each node in the processing graph; (D) upon visiting a first node of the processing graph, access a first node definition of the first node from the nodes database, the first node definition identifies a first program; (E) execute the first program to generate a first output; and (F) pass the first output to a parent node of the first node, the parent node uses the first output during processing of the parent node. In some embodiments, the first node includes a child node, wherein execution of the first program further includes visiting the child node. In some embodiments, visiting the child node includes passing input data from the first node to the child node, wherein visiting the child node includes using the input data to execute another program to generate child output data. In some embodiments, visiting the child node further includes passing the child output data from the child node to the first node. In some embodiments, executing the first program further includes using the child output data to generate the first output. In some embodiments, executing the first program includes executing the first program based upon an embedded programming language provided on the computer system. In some embodiments, executing the first program includes executing a local program stored on a storage device local to the computer system. In some embodiments, the local program is one or more of a reference to a script file, an executable binary file, a local library of functions, and a local service. In some embodiments, executing the first program includes executing an external program performed by another computer system. In some embodiments, the external program is one or more of a reference to a cloud service, an application programming interface (API) service, a third party service, and a network-based service.

In some embodiments, a computer-implemented method for executing a processing graph is provided. The method may be implemented by a computer device including at least one processor in communication with at least one memory device. The method may include: (A) accessing a graph definition of the processing graph from a nodes database, the graph definition identifies a plurality of nodes and one or more edges, each edge of the one or more edges connects a pair of nodes of the plurality of nodes, each node of the processing graph represents a component of computation performed by at least one program referenced by that node; (B) constructing the processing graph in the memory; (C) traversing the processing graph to visit and process each node in the processing graph; (D) upon visiting a first node of the processing graph, accessing a first node definition of the first node from the nodes database, the first node definition identifies a first program; (E) executing the first program to generate a first output; and (F) passing the first output to a parent node of the first node, the parent node uses the first output during processing of the parent node. In some embodiments, the first node includes a child node, wherein execution of the first program further includes visiting the child node. In some embodiments, visiting the child node includes passing input data from the first node to the child node, wherein visiting the child node includes using the input data to execute another program to generate child output data. In some embodiments, visiting the child node further includes passing the child output data from the child node to the first node. In some embodiments, executing the first program further includes using the child output data to generate the first output. In some embodiments, executing the first program includes executing the first program based upon an embedded programming language provided on the computer system. In some embodiments, executing the first program includes executing a local program stored on a storage device local to the computer system. In some embodiments, the local program is one or more of a reference to a script file, an executable binary file, a local library of functions, and a local service. In some embodiments, executing the first program includes executing an external program performed by another computer system. In some embodiments, the external program is one or more of a reference to a cloud service, an application programming interface (API) service, a third party service, and a network-based service.

In some embodiments, a non-transitory computer readable medium having computer-executable instructions embodied thereon for executing a processing graph is provided. When executed by at least one processor, the computer-executable instructions may cause the at least one processor to: (A) access a graph definition of a processing graph from a nodes database, the graph definition identifies a plurality of nodes and one or more edges, each edge of the one or more edges connects a pair of nodes of the plurality of nodes, each node of the processing graph represents a component of computation performed by at least one program referenced by that node; (B) construct the processing graph in the memory; (C) traverse the processing graph to visit and process each node in the processing graph; (D) upon visiting a first node of the processing graph, access a first node definition of the first node from the nodes database, the first node definition identifies a first program; (E) execute the first program to generate a first output; and (F) pass the first output to a parent node of the first node, the parent node uses the first output during processing of the parent node. In some embodiments, the first node includes a child node, wherein execution of the first program further includes visiting the child node. In some embodiments, visiting the child node includes passing input data from the first node to the child node, wherein visiting the child node includes using the input data to execute another program to generate child output data. In some embodiments, visiting the child node further includes passing the child output data from the child node to the first node. In some embodiments, executing the first program further includes using the child output data to generate the first output. In some embodiments, executing the first program includes executing the first program based upon an embedded programming language provided on the computer system. In some embodiments, executing the first program includes executing a local program stored on a storage device local to the computer system. In some embodiments, the local program is one or more of a reference to a script file, an executable binary file, a local library of functions, and a local service. In some embodiments, executing the first program includes executing an external program performed by another computer system. In some embodiments, the external program is one or more of a reference to a cloud service, an application programming interface (API) service, a third party service, and a network-based service.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as conversation data of spoken conversations to be analyzed, mobile device data, and/or additional speech data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the conversation, statement, utterance, spoken word, typed word, geolocation data, and/or other data.

Technical Advantages

The aspects described herein may be implemented as part of one or more computer components such as a client device and/or one or more back-end components, such as a graph processing server, for example. Furthermore, the aspects described herein may be implemented as part of a computer network architecture and/or a cognitive computing architecture that facilitates communications between various other devices, components, and/or users. Thus, the aspects described herein address and solve issues of a technical nature that are necessarily rooted in computer technology.

For instance, aspects include constructing and executing processing graphs that reference various pre-configured nodes, where each node may be configured to perform particular processing functionality. Such processing graphs allow users to construct and execute complex composite calculations in a dynamic, modular fashion. In doing so, the aspects overcome issues associated with the programming and execution of such complex calculations. Without the improvements suggested herein, additional processing and memory usage would be required to perform such calculations. Additional technical advantages include, but are not limited to: i) modularity and reusability of computational functions; ii) automatic detection and integration of dependent computational functions; iii) improved configuration utilities and programming platforms for administrators and programmers; and iv) pre-configuration of a variety of component calculations for various use cases. Additional technical advantages are described in other sections of the specification.

Furthermore, the embodiments described herein improve upon existing technologies, and improve the functionality of computers, by dynamically constructing processing graphs and executing such graphs to perform complex, composite calculations. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to complex processing and ease of use, for example.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In one exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for executing a processing graph, the computer system comprising at least one processor in communication with at least one memory device, the at least one processor programmed to:
   access a graph definition of the processing graph from a nodes database, the graph definition being a virtual data structure that identifies a plurality of nodes and one or more edges, each edge of the one or more edges connecting a pair of nodes of the plurality of nodes and representing a hierarchical relationship between the pair of nodes in which a lower tier node of the pair of nodes generates outputs that a higher tier node of the pair of nodes consumes to generate its outputs, each node of the processing graph representing a software component of computation steps performed by at least one program referenced by that node to generate an output to provide to one or more other nodes in the graph;
   construct the processing graph in the at least one memory device;
   provide a graphical user interface configured to receive input from a user prior to execution of the processing graph, the user input modifying the virtual data structure of the processing graph by adding, editing, replacing, or deleting one or more of the plurality of nodes within the processing graph, thereby reducing memory consumption by loading only the modified virtual structure and associated computations for executing the processing graph;
   traverse the processing graph to visit and process each node in the processing graph;
   upon visiting a node of the processing graph, access a node definition of the node from the nodes database, the node definition identifies a program associated with the node;
   execute the associated program to generate an output; and
   pass the output to a parent node of the node, the parent node uses the output during processing of the parent node.

2. The computer system of claim 1, wherein the node includes a child node, wherein execution of the program further includes visiting the child node.

3. The computer system of claim 2, wherein visiting the child node includes passing input data from the node to the child node, wherein visiting the child node includes using the input data to execute another program to generate child output data.

4. The computer system of claim 3, wherein visiting the child node further includes passing the child output data from the child node to the node.

5. The computer system of claim 3, wherein executing the program further includes using the child output data to generate the output.

6. The computer system of claim 1, wherein executing the program includes executing the program based upon an embedded programming language provided on the computer system.

7. The computer system of claim 1, wherein executing the program includes executing a local program stored on a storage device local to the computer system.

8. The computer system of claim 7, wherein the local program is one or more of a reference to a script file, an executable binary file, a local library of functions, and a local service.

9. The computer system of claim 1, wherein executing the program includes executing an external program performed by another computer system.

10. A computer-implemented method for executing a processing graph, the method implemented by a computer system including at least one processor in communication with at least one memory device, the method comprising:
   accessing a graph definition of the processing graph from a nodes database, the graph definition being a virtual data structure that identifies a plurality of nodes and one or more edges, each edge of the one or more edges connecting a pair of nodes of the plurality of nodes and representing a hierarchical relationship between the pair of nodes in which a lower tier node of the pair of nodes generates outputs that a higher tier node of the pair of nodes consumes to generate its outputs, each node of the processing graph representing a software component of computation steps performed by at least one program referenced by that node to generate an output to provide to one or more other nodes in the graph;
   constructing the processing graph in the at least one memory device;
   providing a graphical user interface that is configured to receive input from a user prior to execution of the processing graph, the user input modifying the virtual data structure of the processing graph by adding, editing, replacing, or deleting one or more of the plurality of nodes within the processing graph, thereby reducing memory consumption by loading only the modified virtual structure and associated computations for executing the processing graph;
   traversing the processing graph to visit and process each node in the processing graph;
   upon visiting a node of the processing graph, accessing a node definition of the node from the nodes database, the node definition identifies a program associated with the node;
   executing the associated program to generate an output; and passing the output to a parent node of the node, the parent node uses the output during processing of the parent node.

11. The method of claim 10, wherein the node includes a child node, wherein execution of the program further includes visiting the child node.

12. The method of claim 11, wherein visiting the child node includes passing input data from the node to the child node, wherein visiting the child node includes using the input data to execute another program to generate child output data.

13. The method of claim 12, wherein visiting the child node further includes passing the child output data from the child node to the node.

14. The method of claim 12, wherein executing the program further includes using the child output data to generate the output.

15. The method of claim 10, wherein executing the program includes executing the program based upon an embedded programming language provided on the computer system.

16. The method of claim 10, wherein executing the program includes executing a local program stored on a storage device local to the computer system.

17. The method of claim 16, wherein the local program is one or more of a reference to a script file, an executable binary file, a local library of functions, and a local service.

18. The method of claim 10, wherein executing the program includes executing an external program performed by another computer system.

19. The computer system of claim 1, wherein the processing graph represents a composite calculation that determines a policy price for an automobile insurance policy, wherein the graph definition includes a policy tier of nodes and at least one lower tier of nodes that provide output to the policy tier of nodes, the at least one lower tier of nodes includes one or more of (i) a customer tier of nodes configured to generate outputs related to a subject customer and (ii) a vehicle tier of nodes configured to generate outputs related to a subject vehicle.

20. The method of claim 10, wherein the processing graph represents a composite calculation that determines a policy price for an automobile insurance policy, wherein the graph definition includes a policy tier of nodes and at least one lower tier of nodes that provide output to the policy tier of nodes, the at least one lower tier of nodes includes one or more of (i) a customer tier of nodes configured to generate outputs related to a subject customer and (ii) a vehicle tier of nodes configured to generate outputs related to a subject vehicle.

* * * * *